US009292479B2

(12) United States Patent
Khosrowshahi et al.

(10) Patent No.: US 9,292,479 B2
(45) Date of Patent: *Mar. 22, 2016

(54) PROVIDING AN ELECTRONIC DOCUMENT COLLECTION

(71) Applicant: Google Inc., Mountain View, CA (US)

(72) Inventors: Farzad Khosrowshahi, Pleasantville, NY (US); Haluk Burcin Tunali, Jersey City, NJ (US); Lev Epshteyn, Brooklyn, NY (US); Joseph Wain, New York, NY (US); Scott M. Johnston, Darien, CT (US); Mandy R. Sladden, Lafayette, CO (US)

(73) Assignee: GOOGLE INC., Mountain View, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/873,836

(22) Filed: Apr. 30, 2013

(65) Prior Publication Data
US 2013/0246346 A1 Sep. 19, 2013

Related U.S. Application Data

(63) Continuation of application No. 12/787,887, filed on May 26, 2010, now Pat. No. 8,434,134.

(51) Int. Cl.
*G06F 7/04* (2006.01)
*G06F 15/16* (2006.01)
(Continued)

(52) U.S. Cl.
CPC ............ *G06F 17/2235* (2013.01); *G06F 17/24* (2013.01); *G06F 17/30011* (2013.01);
(Continued)

(58) Field of Classification Search
CPC ... G06F 17/24; G06F 17/2235; G06F 17/211; G06F 17/241; G06F 17/242; G06F 17/243; G06F 17/244; G06F 17/245; G06F 17/246; G06F 17/247; G06F 17/248; G06F 21/00; G06F 21/10; G06F 21/12; G06F 21/60; G06F 21/62; G06F 21/6209; G06F 21/6218
USPC ............ 707/608–609; 709/209, 213, 221, 22, 709/224, 226, 227
See application file for complete search history.

(56) References Cited

U.S. PATENT DOCUMENTS 5,280,367 A 1/1994 Zuniga
5,448,695 A 9/1995 Douglas et al.
(Continued)

OTHER PUBLICATIONS

Ashman. "Electronic Document Addressing: Dealing with Change." ACM Computing Surveys, vol. 32, No. 3, Sep. 2000, pp. 201-212.
(Continued)

*Primary Examiner* — Jayesh Jhaveri
(74) *Attorney, Agent, or Firm* — Young Basile Hanlon & MacFarlane P.C.

(57) ABSTRACT

In one implementation, a computer-implemented method includes receiving a request to access an electronic document collection that integrates a plurality of electronic sub-documents that are each of one of a plurality of defined document types. The method also includes retrieving information that is associated with the document collection, wherein the retrieved information identifies a first sub-document of the plurality of sub-documents using a first non-address identifier, and identifying a first software application that is configured to provide access to the first sub-document. The method additionally includes initiating a first connection with a first server that causes execution of the identified first software application and that, using the first non-address identifier, provides access to the first sub-document. The method further includes integrating access to the first sub-document into the document collection through the initiated first connection with the first server that causes execution of the first software application.

17 Claims, 21 Drawing Sheets

(51) Int. Cl.
G06F 17/30 (2006.01)
H04L 29/06 (2006.01)
G06F 17/22 (2006.01)
G06F 21/10 (2013.01)
G06F 17/24 (2006.01)
G06F 17/21 (2006.01)
G06F 21/60 (2013.01)
G06F 21/62 (2013.01)
G06F 21/00 (2013.01)
G06F 21/12 (2013.01)

(52) U.S. Cl.
CPC .............. *G06F21/10* (2013.01); *G06F 17/211* (2013.01); *G06F 17/241* (2013.01); *G06F 17/242* (2013.01); *G06F 17/243* (2013.01); *G06F 17/246* (2013.01); *G06F 17/248* (2013.01); *G06F 21/00* (2013.01); *G06F 21/12* (2013.01); *G06F 21/60* (2013.01); *G06F 21/62* (2013.01); *G06F 21/6209* (2013.01); *G06F 21/6218* (2013.01)

(56) References Cited

U.S. PATENT DOCUMENTS

| | | | |
|---|---|---|---|
| 5,493,692 A | 2/1996 | Theimer et al. | |
| 5,544,049 A | 8/1996 | Henderson et al. | |
| 5,600,778 A | 2/1997 | Swanson et al. | |
| 5,613,163 A | 3/1997 | Marron et al. | |
| 5,721,849 A | 2/1998 | Amro | |
| 5,790,127 A | 8/1998 | Anderson et al. | |
| 5,821,928 A | 10/1998 | Melkus et al. | |
| 5,826,015 A | 10/1998 | Schmidt | |
| 5,845,300 A | 12/1998 | Comer et al. | |
| 5,859,640 A | 1/1999 | de Judicibus | |
| 5,877,763 A | 3/1999 | Berry et al. | |
| 5,883,626 A | 3/1999 | Glaser et al. | |
| 5,905,991 A | 5/1999 | Reynolds | |
| 5,966,121 A | 10/1999 | Hubbell et al. | |
| 6,005,575 A | 12/1999 | Colleran et al. | |
| 6,018,341 A | 1/2000 | Berry et al. | |
| 6,272,490 B1 | 8/2001 | Yamakita | |
| 6,295,542 B1 | 9/2001 | Corbin | |
| 6,301,573 B1 | 10/2001 | McIlwaine et al. | |
| 6,377,965 B1 | 4/2002 | Hachamovitch et al. | |
| 6,421,678 B2 | 7/2002 | Smiga et al. | |
| 6,463,078 B1 | 10/2002 | Engstrom et al. | |
| 6,546,393 B1 | 4/2003 | Khan | |
| 6,564,213 B1 | 5/2003 | Ortega et al. | |
| 6,647,383 B1 | 11/2003 | August et al. | |
| 6,654,038 B1 | 11/2003 | Gajewska et al. | |
| 6,751,604 B2 | 6/2004 | Barney et al. | |
| 6,789,251 B1 | 9/2004 | Johnson | |
| 6,820,075 B2 | 11/2004 | Shanahan et al. | |
| 6,865,714 B1 | 3/2005 | Liu et al. | |
| 6,889,337 B1 | 5/2005 | Yee | |
| 6,907,447 B1 | 6/2005 | Cooperman et al. | |
| 6,980,977 B2 | 12/2005 | Hoshi et al. | |
| 7,003,506 B1 | 2/2006 | Fisk et al. | |
| 7,003,737 B2 | 2/2006 | Chiu et al. | |
| 7,031,963 B1 | 4/2006 | Bae | |
| 7,051,277 B2 | 5/2006 | Kephart et al. | |
| 7,073,129 B1 | 7/2006 | Robarts et al. | |
| 7,103,835 B1 | 9/2006 | Yankovich et al. | |
| 7,127,674 B1 * | 10/2006 | Carroll et al. ................. | 715/209 |
| 7,146,422 B1 | 12/2006 | Marlatt et al. | |
| 7,295,995 B1 | 11/2007 | York et al. | |
| 7,353,252 B1 | 4/2008 | Yang et al. | |
| 7,353,397 B1 | 4/2008 | Herbach | |
| 7,370,274 B1 | 5/2008 | Stuple et al. | |
| 7,380,218 B2 | 5/2008 | Rundell | |
| 7,386,789 B2 | 6/2008 | Chao et al. | |
| 7,392,249 B1 | 6/2008 | Harris et al. | |
| 7,395,507 B2 | 7/2008 | Robarts et al. | |
| 7,406,659 B2 | 7/2008 | Klein et al. | |
| 7,451,389 B2 | 11/2008 | Huynh et al. | |
| 7,480,715 B1 | 1/2009 | Barker et al. | |
| 7,487,145 B1 | 2/2009 | Gibbs et al. | |
| 7,499,919 B2 | 3/2009 | Meyerzon et al. | |
| 7,499,940 B1 | 3/2009 | Gibbs | |
| 7,647,312 B2 | 1/2010 | Dai | |
| 7,664,786 B2 | 2/2010 | Oh et al. | |
| 7,685,144 B1 | 3/2010 | Katragadda | |
| 7,685,516 B2 | 3/2010 | Fischer | |
| 7,716,236 B2 | 5/2010 | Sidhu et al. | |
| 7,734,627 B1 | 6/2010 | Tong | |
| 7,756,935 B2 | 7/2010 | Gaucas | |
| 7,761,788 B1 | 7/2010 | McKnight et al. | |
| 7,769,579 B2 | 8/2010 | Zhao et al. | |
| 7,774,328 B2 | 8/2010 | Hogue et al. | |
| 7,779,355 B1 | 8/2010 | Erol et al. | |
| 7,783,965 B1 * | 8/2010 | Dowd et al. ................... | 715/208 |
| 7,818,678 B2 | 10/2010 | Massand | |
| 7,836,044 B2 | 11/2010 | Kamvar et al. | |
| 7,917,848 B2 | 3/2011 | Harmon et al. | |
| 8,020,003 B2 | 9/2011 | Fischer | |
| 8,020,112 B2 | 9/2011 | Ozzie et al. | |
| 8,027,974 B2 | 9/2011 | Gibbs | |
| 8,051,088 B1 | 11/2011 | Tibbetts et al. | |
| 8,086,960 B1 | 12/2011 | Gopalakrishna et al. | |
| 8,091,020 B2 | 1/2012 | Kuppusamy et al. | |
| 8,117,535 B2 | 2/2012 | Beyer et al. | |
| 8,185,448 B1 | 5/2012 | Myslinski | |
| 8,224,802 B2 | 7/2012 | Hogue | |
| 8,229,795 B1 | 7/2012 | Myslinski | |
| 8,239,751 B1 | 8/2012 | Rochelle et al. | |
| 8,260,785 B2 | 9/2012 | Hogue et al. | |
| 8,261,192 B2 | 9/2012 | Djabarov | |
| 8,346,620 B2 | 1/2013 | King et al. | |
| 8,346,877 B2 | 1/2013 | Turner | |
| 8,359,550 B2 | 1/2013 | Meyer et al. | |
| 8,370,275 B2 | 2/2013 | Bhattacharya et al. | |
| 8,386,914 B2 | 2/2013 | Baluja et al. | |
| 8,453,066 B2 | 5/2013 | Ozzie et al. | |
| 8,572,388 B2 | 10/2013 | Boemker et al. | |
| 8,595,174 B2 | 11/2013 | Gao et al. | |
| 8,621,222 B1 | 12/2013 | Das | |
| 8,667,394 B1 * | 3/2014 | Spencer ............... | G06F 17/2241 707/769 |
| 8,782,516 B1 | 7/2014 | Dozier | |
| 8,799,765 B1 * | 8/2014 | MacInnis et al. ............. | 715/230 |
| 8,856,645 B2 | 10/2014 | Vandervort et al. | |
| 8,904,284 B2 | 12/2014 | Grant et al. | |
| 2001/0025287 A1 * | 9/2001 | Okabe et al. ................... | 707/511 |
| 2002/0010725 A1 | 1/2002 | Mo | |
| 2002/0029337 A1 | 3/2002 | Sudia et al. | |
| 2002/0035714 A1 | 3/2002 | Kikuchi et al. | |
| 2002/0069223 A1 | 6/2002 | Goodisman et al. | |
| 2002/0070977 A1 | 6/2002 | Morcos et al. | |
| 2002/0103914 A1 | 8/2002 | Dutta et al. | |
| 2002/0129100 A1 | 9/2002 | Dutta et al. | |
| 2002/0152255 A1 | 10/2002 | Smith, Jr. et al. | |
| 2002/0161839 A1 | 10/2002 | Colasurdo et al. | |
| 2002/0187815 A1 | 12/2002 | Deeds et al. | |
| 2003/0046263 A1 | 3/2003 | Castellanos et al. | |
| 2003/0058286 A1 | 3/2003 | Dando | |
| 2003/0069877 A1 | 4/2003 | Grefenstette et al. | |
| 2003/0156130 A1 | 8/2003 | James et al. | |
| 2003/0172353 A1 | 9/2003 | Cragun | |
| 2003/0200192 A1 | 10/2003 | Bell et al. | |
| 2003/0234822 A1 | 12/2003 | Spisak | |
| 2004/0061716 A1 | 4/2004 | Cheung et al. | |
| 2004/0062213 A1 | 4/2004 | Koss | |
| 2004/0122846 A1 | 6/2004 | Chess et al. | |
| 2004/0139465 A1 | 7/2004 | Matthews, III et al. | |
| 2004/0140901 A1 | 7/2004 | Marsh | |
| 2004/0145607 A1 | 7/2004 | Alderson | |
| 2004/0153973 A1 | 8/2004 | Horwitz | |
| 2004/0164991 A1 | 8/2004 | Rose | |
| 2004/0177319 A1 | 9/2004 | Horn | |
| 2005/0024487 A1 | 2/2005 | Chen | |
| 2005/0028081 A1 * | 2/2005 | Arcuri et al. ................. | 715/501.1 |
| 2005/0034060 A1 | 2/2005 | Kotler et al. | |

(56) References Cited

U.S. PATENT DOCUMENTS

| | | | |
|---|---|---|---|
| 2005/0039191 A1 | 2/2005 | Hewson et al. |
| 2005/0044132 A1 | 2/2005 | Campbell et al. |
| 2005/0044369 A1 | 2/2005 | Anantharaman |
| 2005/0055416 A1 | 3/2005 | Heikes et al. |
| 2005/0120308 A1 | 6/2005 | Gibson et al. |
| 2005/0144162 A1 | 6/2005 | Liang |
| 2005/0144573 A1 | 6/2005 | Moody et al. |
| 2005/0160065 A1 | 7/2005 | Seeman |
| 2005/0183001 A1 | 8/2005 | Carter et al. |
| 2005/0198589 A1 | 9/2005 | Heikes et al. |
| 2005/0210256 A1 | 9/2005 | Meier et al. |
| 2005/0246653 A1 | 11/2005 | Gibson et al. |
| 2006/0005142 A1 | 1/2006 | Karstens |
| 2006/0010865 A1 | 1/2006 | Walker |
| 2006/0041836 A1 | 2/2006 | Gordon et al. |
| 2006/0047682 A1 | 3/2006 | Black et al. |
| 2006/0080303 A1 | 4/2006 | Sargent et al. |
| 2006/0106778 A1* | 5/2006 | Baldwin ............ G06F 17/3087 |
| 2006/0150087 A1 | 7/2006 | Cronenberger et al. |
| 2006/0190435 A1 | 8/2006 | Heidloff et al. |
| 2006/0213993 A1* | 9/2006 | Tomita ............... G06F 17/2288 |
| | | | 235/454 |
| 2006/0248070 A1 | 11/2006 | Dejean et al. |
| 2007/0005581 A1 | 1/2007 | Arrouye et al. |
| 2007/0005697 A1 | 1/2007 | Yuan et al. |
| 2007/0033200 A1 | 2/2007 | Gillespie |
| 2007/0143317 A1 | 6/2007 | Hogue et al. |
| 2007/0150800 A1 | 6/2007 | Betz et al. |
| 2007/0168355 A1 | 7/2007 | Dozier et al. |
| 2007/0198952 A1* | 8/2007 | Pittenger ................ G06F 17/24 |
| | | | 715/853 |
| 2007/0220259 A1 | 9/2007 | Pavlicic |
| 2007/0280205 A1 | 12/2007 | Howell et al. |
| 2007/0291297 A1 | 12/2007 | Harmon et al. |
| 2008/0022107 A1 | 1/2008 | Pickles et al. |
| 2008/0028284 A1 | 1/2008 | Chen |
| 2008/0034213 A1 | 2/2008 | Boemker et al. |
| 2008/0059539 A1 | 3/2008 | Chin et al. |
| 2008/0082907 A1 | 4/2008 | Sorotokin et al. |
| 2008/0120319 A1 | 5/2008 | Drews et al. |
| 2008/0172608 A1 | 7/2008 | Patrawala et al. |
| 2008/0208969 A1 | 8/2008 | Van Riel |
| 2008/0239413 A1 | 10/2008 | Vuong et al. |
| 2008/0320397 A1 | 12/2008 | Do et al. |
| 2009/0006936 A1 | 1/2009 | Parker et al. |
| 2009/0013244 A1 | 1/2009 | Cudich et al. |
| 2009/0044143 A1 | 2/2009 | Karstens |
| 2009/0044146 A1 | 2/2009 | Patel et al. |
| 2009/0083245 A1 | 3/2009 | Ayotte et al. |
| 2009/0094178 A1 | 4/2009 | Aoki |
| 2009/0132560 A1 | 5/2009 | Vignet |
| 2009/0192845 A1 | 7/2009 | Gudipaty et al. |
| 2009/0198670 A1* | 8/2009 | Shiffer .............. G06F 17/30675 |
| 2009/0204818 A1 | 8/2009 | Shin et al. |
| 2009/0282144 A1 | 11/2009 | Sherrets et al. |
| 2009/0292673 A1 | 11/2009 | Carroll |
| 2010/0070448 A1 | 3/2010 | Omoigui |
| 2010/0070881 A1 | 3/2010 | Hanson et al. |
| 2010/0076946 A1 | 3/2010 | Barker et al. |
| 2010/0100743 A1 | 4/2010 | Ali et al. |
| 2010/0121888 A1 | 5/2010 | Cutting et al. |
| 2010/0131523 A1 | 5/2010 | Yu et al. |
| 2010/0180200 A1 | 7/2010 | Donneau-Golencer et al. |
| 2010/0191744 A1 | 7/2010 | Meyerzon et al. |
| 2010/0198821 A1 | 8/2010 | Loritz et al. |
| 2010/0223541 A1 | 9/2010 | Clee et al. |
| 2010/0251086 A1 | 9/2010 | Haumont et al. |
| 2010/0268700 A1 | 10/2010 | Wissner et al. |
| 2010/0269035 A1 | 10/2010 | Meyer et al. |
| 2010/0275109 A1 | 10/2010 | Morrill |
| 2010/0281353 A1 | 11/2010 | Rubin |
| 2011/0016106 A1 | 1/2011 | Xia |
| 2011/0043652 A1 | 2/2011 | King et al. |
| 2011/0060584 A1 | 3/2011 | Ferrucci et al. |
| 2011/0072338 A1 | 3/2011 | Caldwell |
| 2011/0082876 A1 | 4/2011 | Lu et al. |
| 2011/0087973 A1 | 4/2011 | Martin et al. |
| 2011/0126093 A1 | 5/2011 | Ozzie et al. |
| 2011/0173210 A1 | 7/2011 | Ahn et al. |
| 2011/0179378 A1 | 7/2011 | Wheeler et al. |
| 2011/0191276 A1 | 8/2011 | Cafarella et al. |
| 2011/0209064 A1 | 8/2011 | Jorgensen et al. |
| 2011/0219291 A1 | 9/2011 | Lisa |
| 2011/0225482 A1 | 9/2011 | Chan et al. |
| 2011/0225490 A1 | 9/2011 | Meunier |
| 2011/0252312 A1 | 10/2011 | Lemonik et al. |
| 2011/0276538 A1 | 11/2011 | Knapp et al. |
| 2011/0296291 A1* | 12/2011 | Melkinov ............ G06F 17/2229 |
| | | | 715/229 |
| 2011/0306028 A1 | 12/2011 | Galimore |
| 2012/0078826 A1 | 3/2012 | Ferrucci et al. |
| 2012/0084644 A1 | 4/2012 | Robert et al. |
| 2012/0095979 A1 | 4/2012 | Aftab et al. |
| 2012/0124053 A1 | 5/2012 | Ritchford et al. |
| 2012/0166924 A1 | 6/2012 | Larson et al. |
| 2012/0185473 A1 | 7/2012 | Ponting et al. |
| 2012/0226646 A1 | 9/2012 | Donoho et al. |
| 2012/0254730 A1 | 10/2012 | Sunderland et al. |
| 2012/0284602 A1 | 11/2012 | Seed et al. |
| 2012/0304046 A1 | 11/2012 | Neill et al. |
| 2013/0132566 A1 | 5/2013 | Olsen et al. |
| 2013/0165086 A1 | 6/2013 | Doulton |
| 2013/0212062 A1 | 8/2013 | Levy et al. |
| 2013/0268830 A1 | 10/2013 | Khosrowshahi et al. |
| 2014/0013197 A1 | 1/2014 | McAfee et al. |
| 2014/0032913 A1 | 1/2014 | Tenenboym et al. |

OTHER PUBLICATIONS

Fox. "Maps API Blog: Creating Dynamic Client-side Maps Mashups with Google Spreadsheets." http://googlemapsapi.blogspot.com/2007/03/creating-dynamic-client-side-maps.html>. 2 pages.

'GeekRant.org' [online]. "How to Embed a Word Document in Another Word DOcument," Sep. 14, 2005, [retrieved on Dec. 5, 2011]. Retrieved from the Internet: <URL: http://www.geekrant.org/2005/09/14/word-embed-document/>. 6 pages.

Herrick. "Google this Using Google Apps for Collaboration and Productivity." Proceedings of the ACM Siguccs Fall Conference on User Services Conference, Siguccs '09, Jan. 2009, p. 55.

Kappe. "Hyper-G: A Distributed Hypermedia System." Proceedings of the International Networking COnference, 1993, [retrieved on Oct. 20, 2011]. Retrieved from the Internet: <URL: http://ftp.iicm.tugraz.at/pub/papers/inet93.pdf>. 9 pages.

Kircher. "Lazy Acquisition." Proceedings of the 6th European Conference on Pattern Languages of Programs, Jul. 2011, pp. 1-11.

'Microsoft Support' [online]. "How to Embed and Automate Office Documents with Visual Basic," Mar. 27, 2007, [retrieved on Dec. 5, 2011]. Retrieved from the Internet: <URL http://support.microsoft.com/kb/242243>. 6 pages.

'Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.

Oracle Provider for OLE DB—Developer's Guide. 10g Release 1 (10.1). Dec. 2003, Oracle Corporation, 90 pages.

'WebArchive' [online]. "Supplementary Notes for MFC Programming Module 23 and Module 27: Interfaces, COM, COM+ and OLE" in: http://www.tenouk.com/visualcplusmfc/mfcsupp/ole.html, Jan. 6, 2008, [retrieved on Dec. 5, 2011]. Retrieved from the Internet: <URL: http://web.archive.org/web/20091125073542/http://www.tenouk.com/visualcplusmfc/mfcsupp/ole.html>. 4 pages.

Authorized Officer D. Golze. International Search Report and Written Opinion of the International Searching Authority in PCT Application No. PCT/US2011/037862, dated Oct. 31, 2011, 64 pages.

Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.

Pinkas et al. "CMS Advanced Electrponic Signatures," Request for Comments 5126, Feb. 2008, 142 pages.

(56) References Cited

OTHER PUBLICATIONS

"Bohman, P. ""Introduction to Web Accessibility""", Oct. 2003, ebAIM, printed Apr. 17, 2004,<http://www.webaim.org/intro/?templatetype=3> (p. 1-6)".

"Caldwell et al., ""Web Content Accessibility Guidelines 2.0, W3C Working Draft Mar. 11, 2004""", Mar. 11, 2004, WorldWide Web Consortium (p. 1-56)".

Francik, E., Computer-& screen-based interfaces: Universal design filter, Human Factors Engineering, Pacific Bell Version 2, Jun. 6, 1996.

Griesser, A., "A generic editor Full text," pp. 50-55, 1997 ACM Press NewYork, NY, USA.

Jacobs, Ian, et al., "User Agent Accessibility Guidelines 1.0, W3C Recommendation Dec. 17, 2002", World Wide Web Consortium, 115 pages.

Treviranus, Jutta, et al., "Authoring Tool Accessibility Guidelines 1.0, W3C Recommendation Feb. 3, 2000", World Wide Web Consortium (p. 1-22).

Jourdan, Guy-Vincent, CSI 3140 WWW Structures, Techniques and Standards, Cascading Style Sheets, power point slides, published Feb. 16, 2010.

W3C, Cascading Style sheets Level 2 Revision 1 Specification, Apr. 15, 2011, 487 pages.

* cited by examiner

FIG. 4M

PROVIDING AN ELECTRONIC DOCUMENT COLLECTION

CROSS-REFERENCE TO RELATED APPLICATIONS

This application is a continuation of U.S. patent application Ser. No. 12/787,887, which was filed on May 26, 2010.

TECHNICAL FIELD

This document generally describes techniques, methods, and systems for providing an electronic document collection.

BACKGROUND

An electronic document can be formatted according to a defined document type. For example, a text document can be formatted to contain strings of American Standard Code for Information Interchange (ASCII)-encoded characters that are separated by line breaks. An electronic document can be accessed by a user with various applications that are configured to interpret documents of the electronic document's type. For instance, a text editor application can be used to open, edit, and save text documents (e.g., a text document with a ".txt" extension) and a graphics application can be used to open, edit, and save graphics documents (e.g., a portable network graphics document with a ".png" extension).

Electronic directories and folders can be configured as part of a file system to contain a group of documents of various defined document types. For example, an electronic directory can be configured to contain a text document and a graphics document. Documents can be grouped in an electronic directory or folder according to storage locations for the documents. For example, a first document with a storage location of "/usr/doc/first.txt" and a second document with a storage location of "/usr/doc/second.txt" can be grouped into the same directory ("/usr/doc").

SUMMARY

This document describes techniques, methods, and systems for providing a document collection. Generally, a document collection can include sub-documents of a defined document type that, by being part of the document collection, are logically grouped together. A document collection can be provided in a single interface that permits a user to interact with each of the sub-documents contained in the document collection.

For example, assume that a user has several electronic documents of various document types that relate to an upcoming vacation. For instance, the user may have a word processing document that includes an itinerary for the vacation, a spreadsheet detailing a budget for the vacation, electronic maps showing routes to take during the vacation, and web page documents containing reservation confirmation numbers for the vacation. The user can include each of these documents (word processing document, spreadsheet, maps, web page documents) in a document collection such that they are logically grouped together with regard to the upcoming vacation and can be readily accessed in an interface for the document collection.

Document collections can be provided using non-address identifiers for the sub-documents. For example, an address-based identifier for a document, such as a file path (e.g., /example/file.txt), can "break" if some aspect of the address is changed (e.g., directory renamed) or the document is moved to a different location. Non-address identifiers, such as a unique document identifier maintained in a data repository, can be used in document collections to provide robust connections between sub-documents and the document collection. A non-address identifier for a sub-document can be used as part of a uniform resource locator (URL) to request access to the sub-document (e.g., www.example-domain.com?sub-document=[non-address identifier]). In some implementations, a sub-document that is part of a document collection may lose some of its independence and, as a result, may not be individually accessible. Instead, a request for a sub-document may cause the document collection, of which the sub-document is a part, to be returned.

Document collections can be provided in a variety of environments, such as "in the cloud" (e.g., client-server architecture that distributes processing associated with a document across the client and server). For example, processing associated with applications that are configured to interpret sub-documents can be performed in-part by a client and in-part by a server system.

In one implementation, a computer-implemented method includes receiving, at a computer system, a request to access an electronic document collection that integrates a plurality of electronic sub-documents that are each of one of a plurality of defined document types. The method further includes retrieving information that is associated with the document collection, wherein the retrieved information identifies a first sub-document of the plurality of sub-documents using a first non-address identifier that does not provide a storage location for the first sub-document. The method also includes identifying a first software application that is configured to provide access to the first sub-document, and initiating a first connection with a first server that causes execution of the identified first software application and that, using the first non-address identifier, provides access to the first sub-document. The method additionally includes integrating access to the first sub-document into the document collection through the initiated first connection with the first server that causes execution of the first software application.

In another implementation, a system for providing access to an electronic document collection includes an integration server system that is configured to integrate access to a plurality of electronic sub-documents that are each of one of a plurality of defined document types into an electronic document collection. The system also includes an interface to the integration server system that is configured to receive a request to access the document collection. The system further includes a document collection data repository that is configured to store information associated with the document collection that identifies each of the plurality of sub-documents of the document collection using a non-address identifier that does not provide a storage location for a sub-document. The system additionally includes a sub-document access integrator that is configured to provide integrated access to the plurality of sub-documents by initiating connections with one or more of a plurality of application server systems that are each configured to provide access to one or more of the plurality of sub-documents using one or more software applications, wherein the sub-document access integrator is configured to initiate the connections with the one or more of the plurality of application server systems using the non-address identifiers.

In another implementation, a system for providing access to an electronic document collection includes an integration server system that is configured to integrate access to a plurality of electronic sub-documents that are each of one of a plurality of defined document types into an electronic document collection. The system also includes an interface to the integration server system that is configured to receive a request to access the document collection, and a document collection data repository that is configured to store information associated with the document collection that identifies each of the plurality of sub-documents of the document collection using a non-address identifier that does not provide a storage location for a sub-document. The system further includes means for providing integrated access to the plurality of sub-documents, wherein the means for providing integrated access is configured to initiate connections with one or more of a plurality of application server systems that are each configured to provide access to one or more of the plurality of sub-documents using one or more software applications, wherein the means for providing integrated access is configured to initiate the connections with the one or more of the plurality of application server systems using the non-address identifiers.

The details of one or more embodiments are set forth in the accompanying drawings and the description below. Various advantages can be realized with certain implementations, such as providing users with the ability to logically group sub-documents of various document types together in a document collection. Document collections can make sharing (e.g., emailing, providing network-based access to, etc.) related documents easier for users—by sharing a single document collection, each of the sub-documents contained in the document collection can also be shared. By providing document collections "in the cloud," a user can share a document collection with another user without concern for whether the other user has appropriate applications installed on his/her computing device, and the documents can be accessed from a variety of internet-connected devices. Using non-address identifiers in a document collection, sub-documents can be robustly included in a document collection.

Document collections can provide a structure that inherently encourages users to logically organize sub-documents as part of document collection. Such organization can be particularly useful with cloud-based computing, which may provide users less autonomy to organize documents on a server system. Additionally, users can readily provide organization associated with a document collection to other users by simply sharing a document collection, which can save other users the time it would otherwise take to piece sub-documents together.

Document collections can be accessed over a network (e.g., the Internet, a local area network, etc.) such that an owner of a document collection can essentially have a site (e.g., a website) that includes the content of the document collection. Using document collections, site creation and management can be simplified for a user. Conventionally, site creation involves a user establishing a site (e.g., registering a domain name and reserving space on an associated hosting server) and then adding content to the site (e.g., uploading web accessible files to the hosting server). Instead, a document collection can be transitioned into a site such that the site is populated with content from the document collection without the user having to go through the trouble of creating a site first.

Operations between sub-documents (e.g., copy and paste) that are part of a document collection provided in the cloud can be simplified for users. For example, when copying and pasting between documents that are provided in the cloud but not as part of a document collection, a user can experience difficulty transferring data and various data attributes (e.g., data typing, data formatting) from a first document to a second document as part of the copy and past operations. However, with a document collection, various entities on the client and/or server-side (e.g., application integrator, document collection manager, sub-document modules, etc.) can coordinate copying and pasting between sub-documents such that data, and it attributes, are properly transferred between the sub-documents.

Document collections can provide additional features that are shared across sub-documents. For example, documents provided in the cloud can have associated chat (e.g., instant messaging) logs. Instead of having separate chat logs associated with each sub-document, a single chat log can be maintained for the entire document collection such that, if a user is chatting while accessing a first sub-document and then switches to accessing a second sub-document, then the same chat can continue with the second sub-document. As another example, an undo/redo stack and information regarding revisions can be shared for sub-documents of a document collection, instead of using individual undo/redo stacks and individual revision information for each sub-document. This can permit users to more easily track changes over time to the document collection as a whole. In a further example, permissions (and access control lists) can be associated with a document collection and shared across sub-documents that are part of the document collection. This can permit simplified management of permissions associated with a document collection and its sub-documents.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
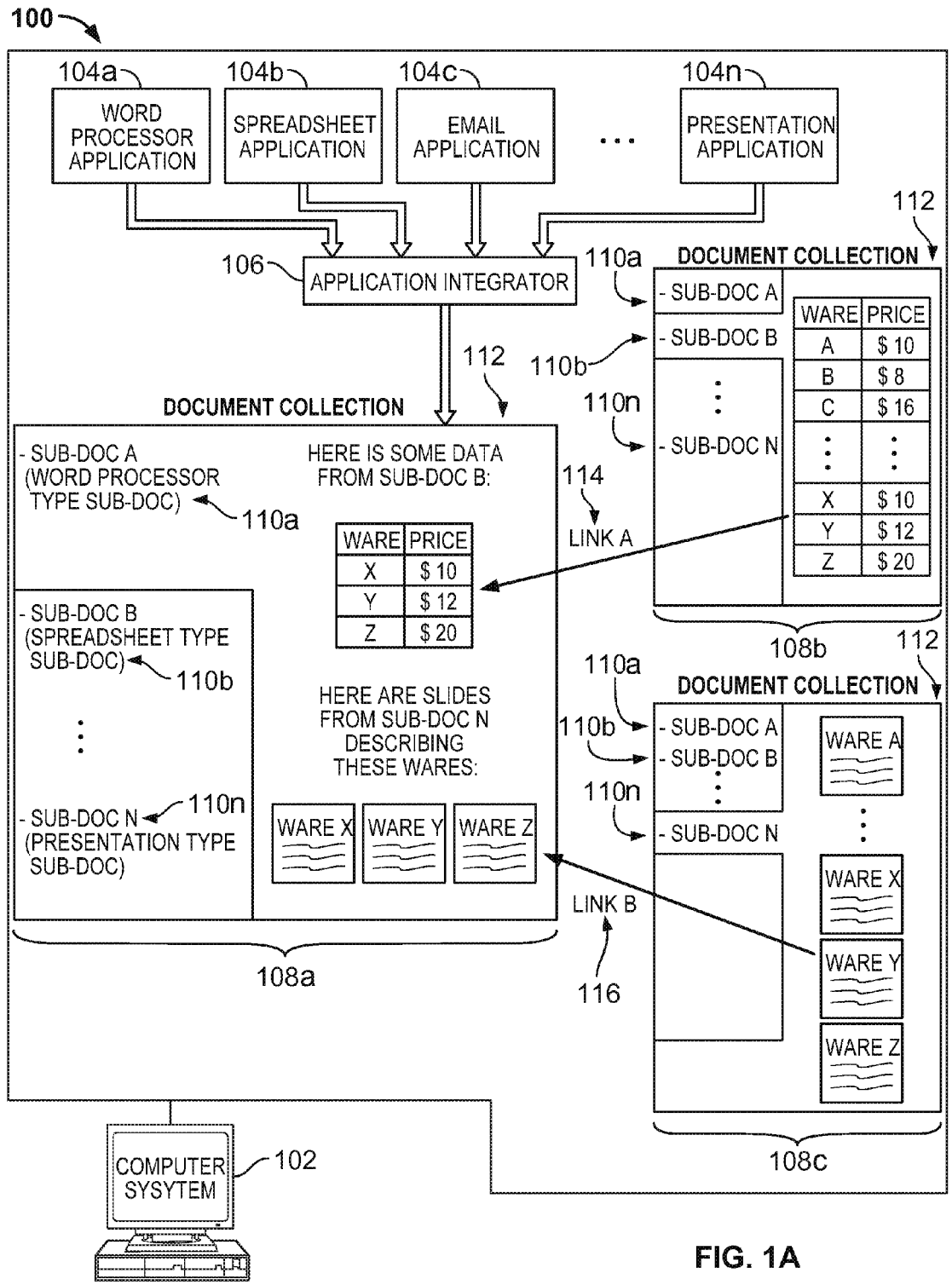
FIGS. 1A-B are conceptual diagrams of example systems for providing an electronic document collection.

This document generally describes techniques, methods, systems, and computer program products for providing an electronic document collection. An electronic document collection can include sub-documents of various document types (e.g., spreadsheet, word processing, web pages, etc.) that are provided together in a common interface. A sub-document can be a document of a defined document type, where the document type is identified by the type of the document it represents and not by the content of a particular document of that document type.

A document collection can allow a user to logically group sub-documents together. For example, assume a user has prepared a word processing document that provides an agenda for a meeting, a presentation document to be displayed during the meeting, a map document depicting the location of the meeting, and a computer-aided design (CAD) document for a product that is the subject of the meeting. The user can logically group these related documents, which are of different document types, together as sub-documents in a document collection. Instead of having to share each of the individual sub-documents with other users attending the meeting, the user can share just the document collection.

A document collection can include sub-documents of different document types. For instance, an example document collection can include a word processing sub-document (e.g., a WORD document), a presentation sub-document (e.g., a POWERPOINT presentation), a spreadsheet sub-document (e.g., an EXCEL spreadsheet), a graphics sub-document (e.g., a PHOTOSHOP document), and a web page sub-document (e.g., a hypertext markup language (HTML) document). This example document collection can be displayed in a graphical user interface (GUI) by an application that interprets the document collection such that a user can interact with each of the different sub-documents (word processing sub-document, spreadsheet sub-document, etc.) using the GUI. For instance, the user can use the GUI to view, edit, and save each of the sub-documents in the document collection.

A document collection can be configured to include sub-documents in the document collection using non-address identifiers for the sub-documents. A non-address identifier identifies the sub-document for inclusion in a document collection without relying on a storage location for the sub-document. A non-address identifier can provide a more robust connection between sub-documents and a document collection than can a link that is based upon a storage location. A variety of actions can cause a link based upon a storage location to break, such as a linked-to document being renamed (e.g., change from "first.txt" to "second.txt"), a linked-to document being moved to a different folder (e.g., move from "My Documents" folder to "Desktop" folder), a directory in the storage path of a linked-to document being renamed (e.g., rename directory "test" in path "/Shared Files/test/first.txt" to be "test1"), etc.

Document collections, in certain implementations, can further permit dynamic integration of data across sub-documents within a document collection. For example, assume that a document collection includes a map sub-document and a spreadsheet sub-document that includes a list of locations. By including the map sub-document and the spreadsheet-document in the document collection, a link can be established between the list of locations in the spreadsheet document and the map document such that the map document displays icons for each of the locations in the list of locations. The list of locations in the spreadsheet sub-document can be dynamically accessed to display icons corresponding to the list of locations in the map sub-document. Such dynamic accessing can permit changes to the list of locations in the spreadsheet sub-document to be automatically reflected to the map sub-document without a user having to perform updates on the map sub-document.

Non-address identifiers can be used to provide robust dynamic links between sub-documents in a document collection. Referring to the example from the previous paragraph, a link to the list of locations in the spreadsheet sub-document can be represented, at least in part, in the map sub-document using a non-address identifier for the spreadsheet sub-document. By using the non-address identifier for the spreadsheet sub-document, the dynamic link to the list of locations in the spreadsheet sub-document can be less susceptible to "breaking" like a link that is based upon a storage location, as described above.

A document collection can be provided in an interface that integrates interfaces for a variety of applications that are configured to execute one or more document data types. For example, a document collection that includes a word processing sub-document and a spreadsheet sub-document can be displayed in a GUI that integrates a GUI for a word processing application and a GUI for a spreadsheet application. An interface for the document collection can include various controls for integrating the sub-documents, such as a control to permit a user to toggle between interfaces for the sub-documents, a control to dynamically link data between sub-documents, etc. For instance, a GUI for a document collection can include selectable tabs that allow a user to select which sub-documents are displayed and drop-down menus for establishing a dynamic data link between sub-documents.

Additionally, document collections can be provided "in the cloud"—meaning that a distributed server-side architecture can be used to provide a client computing device with access to a document collection. For example, assume a server system receives a request from a client computing device (e.g., a desktop computer, a laptop, a mobile phone, an electronic book (e-book) reader, etc.) for access to a document collection. The server system can distribute performance of operations related the request, such interpreting sub-documents of the requested document collection, across multiple servers and provide the client computing device with information to display the requested document collection.

In another example, assume a first set of servers is responsible for executing a word processing application, a second set of servers is responsible for executing a spreadsheet application, and a third set of servers is responsible for performing operations related to a document collection and coordinating operations among the first and second set of servers. When a request is received from a client device for access to a document collection containing a word processing type sub-document and a spreadsheet type sub-document, processing of the request can be distributed across the first, second, and third set of servers. The first, second, and third set of servers can coordinate their efforts to provide the client device with information to display the requested portion of the document collection. In some implementations, a fourth set of servers can be used to provide access to a document collection by coordinating and integrating operations across the first, second, and third set of servers.

By shifting some processing associated with a document collection to a server system, a client computing device that has limited processing capacity (e.g., netbooks, mobile phones, e-book readers, televisions, etc.) can access a document collection with less strain on the client's processing and/or storage resources. For instance, by accessing a document collection "in the cloud," a client device can display a document collection that contains sub-documents of various document types without having corresponding applications installed or running on the client device. Such a client device can use a "thin client" (an application with limited functionality that may rely upon interactions with a server-side application to provide additional functionality) to interact with a server-side system to provide access to a document collection on the client device.

Figure 1B:
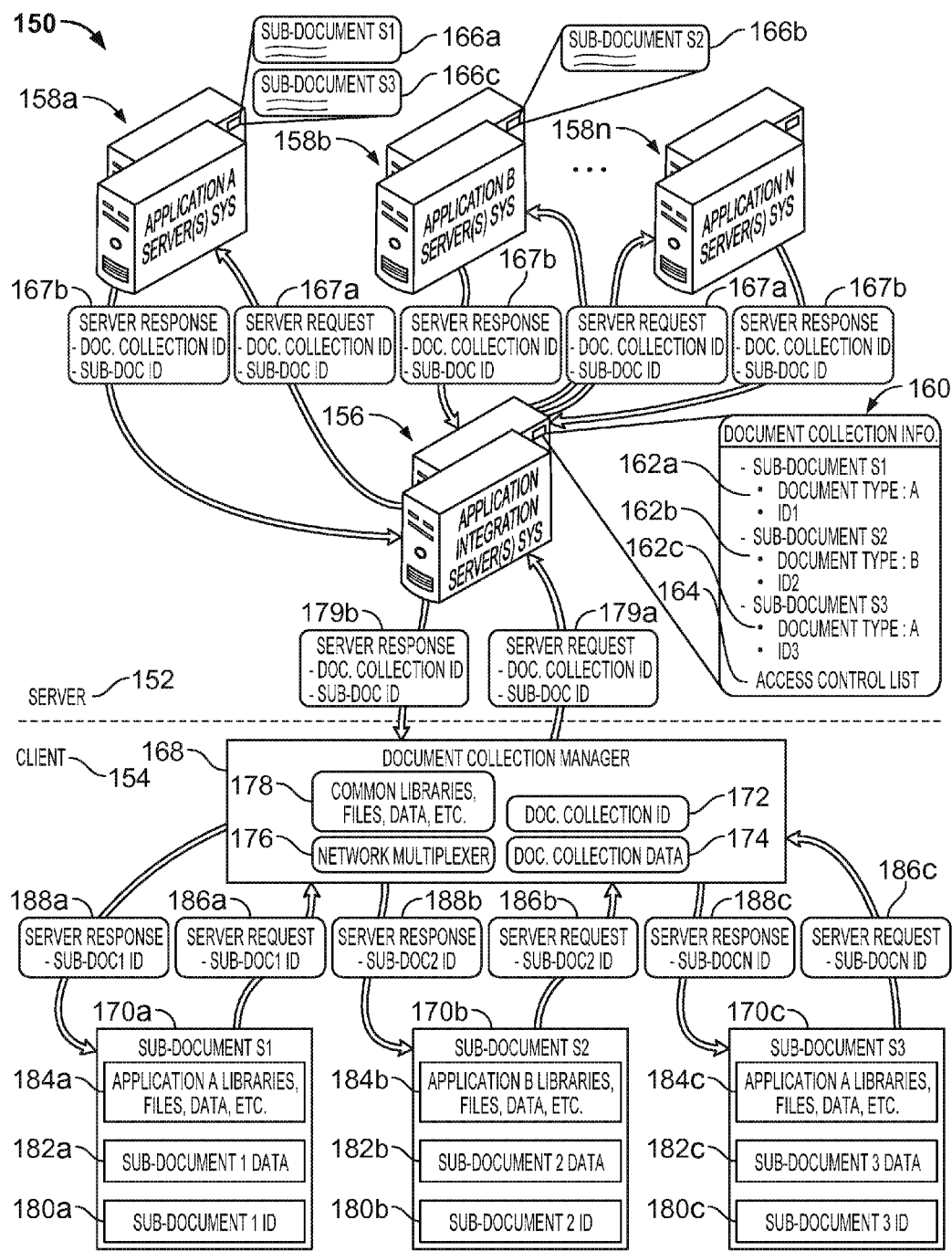

FIGS. 1A-B are conceptual diagrams of example systems 100 and 150 for providing an electronic document collection. In FIG. 1A, the example system 100 is depicted as including a computer system 102 that is configured to integrate multiple applications 104a-n to provide an interface for an example document collection that includes sub-documents A-N. The computer system 102 is depicted as using an application integrator 106 to provide the interface for the example document collection using the applications 104a-n.

A variety of applications can be integrated to provide access to document collection using the application integrator

106. For instance, in the depicted example the application 104*a* is a word processor application (e.g., MICROSOFT WORD, ADOBE ACROBAT), the application 104*b* is a spreadsheet application (e.g., APPLE NUMBERS, MICROSOFT EXCEL), the application 104*c* is an email application (e.g., MICROSOFT OUTLOOK, APPLE MAIL), and the application 104*n* is a presentation application (e.g., APPLE KEYNOTE, MICROSOFT POWERPOINT).

The application integrator 106 provides an interface 108*a* on the computer system 102 for a document collection that is depicted as including sub-documents A-N. Sub-documents can be of a defined document type, such as a text document, a graphics document, a spreadsheet document, etc. In the depicted example, the sub-document A is a word processor type sub-document, the sub-document B is a spreadsheet type sub-document, and the sub-document N is a presentation type sub-document.

In the depicted example interface 108*a*, the application integrator 106 provides selectable tabs 110*a-n* on the left-side and a sub-document display area 112 on the right-side. The selectable tabs 110*a-n* correspond to the sub-documents A-N such that user selection (e.g., mouse click, touchscreen input, etc.) of one of the selectable tabs 110*a-n* causes a corresponding sub-document to be displayed in the sub-document display area 112. The interface 108*a* depicts the tab 110*a* having been selected and sub-document A being displayed in the sub-document display area 112.

Given that the sub-document A is a word processor type sub-document, the application integrator 106 can interact with the word processor application 104*a* to display sub-document A in the sub-document display area 112. For example, assume the application integrator 106 receives information through the interface 108*a* indicating that a user selected the tab 110*a* (e.g., receive an event indicating user selection of the tab). In response, the application integrator 106 can access information (e.g., configuration files and/or data) for the document collection to identify that the user selection pertains to sub-document A, that sub-document A is of a word processor document type, and that the word processor application 104*a* is configured to interpret word processor type documents. The application integrator 106 can send a request to the word processor application 104*a* to provide information for displaying the sub-document A. In response, the word processor application 104*a* can interpret the sub-document A (e.g., read and render sub-document A for display as a word processor type document) and provide the requested information (e.g., display elements (text, images, etc.), formatting information, events to monitor, etc.) to the application integrator 106. The application integrator 106 can use the information received from the word processor application 104*a* to populate the sub-document display area 112 of the interface 108*a*.

A user can toggle between the sub-documents A-N in the sub-document display area 112 for the document collection using the selectable tabs 110*a-n*. Interfaces 108*b* and 108*c* provide example depictions of interface 108*a* in response to user selection of tabs 110*b* and 110*n*, respectively. The interface 108*b* depicts the sub-document display area 112 containing sub-document B in response to selection of tab 110*b*. The interface 108*c* depicts the sub-document display area 112 displaying sub-document N in response to selection of tab 110*n*.

Similar to the interactions with the word processor application 104*a* described above, the application integrator 106 can provide the sub-documents B and N in the sub-document display area 112 through interactions with corresponding applications. Given that the sub-document B is a spreadsheet type document, the application integrator 106 can interact with the spreadsheet application 104*b* to provide the sub-document B in the sub-document display area 112 of the interface 108*b*. Similarly, given that the sub-document N is a presentation type document, the application integrator 106 can interact with the presentation application 104*n* to provide the sub-document N in the sub-document display area 112 of the interface 108*c*.

The sub-documents can use non-address identifiers to link data contained in one sub-document with another sub-document. For example, a link A 114 is depicted between data regarding prices for wares X-Z in sub-document B and a portion of sub-document A. The link A 114 can be contained in sub-document A and can include a non-address identifier that identifies the sub-document B and information identifying the specific data regarding prices for wares X-Z in sub-document B. For example, the link A 114 can be a tag contained in the sub-document A, such as "<link name='sub-document B' type='spreadsheet' identifier='123' data='cell: X0-cell:Z1'>." In this example, the "name" field corresponds to the name of the sub-document B, the "type" field corresponds to the document type for sub-document B, the "identifier" field corresponds to the non-address identifier for sub-document B, and the "data" field corresponds to the range of cells in sub-document B that include the data regarding prices for wares X-Z.

When the word processor application 104*a* interprets the sub-document A and encounters the link A 114, the word processor application 104*a* can provide a request to the application integrator 106 for interpretation of the linked-to data (cells in sub-document B regarding prices for wares X-Z) by an application that is configured to interpret a spreadsheet type document, as specified in the link A 114. Upon receiving the request, the application integrator 106 can reference configuration information for the applications 104*a-n* and identify that the spreadsheet application 104*b* is configured to interpret sub-document B. The application integrator 106 can provide a request for interpretation of the link A 114 to the spreadsheet application 104*b*. The spreadsheet application 104*b* can interpret the sub-document B and provide information regarding the requested data (e.g., display elements (cell data, cell formulas), formatting for the cells, events to be monitored, etc.) to the application integrator 106. The application integrator 106 can provide the information from the spreadsheet application 104*b* regarding the link A 114 to the word processor application 104*a* for integration into the sub-document A. In some implementations, the application integrator 106 can insert the information from the spreadsheet application 104*b* regarding the link A 114 into the sub-document A when providing information for display of sub-document A in the sub-document display area 112.

By referencing the data directly from the sub-document B using the link A 114, the cells from sub-document B regarding prices for wares X-Z can be automatically updated to reflect the current values for the corresponding cells in the sub-document B. For example, assume a user changes the price for ware X from $10 to $15 in sub-document B using the interface 108*b*. When the user selects the tab 110*a* to display sub-document A in the sub-document display area 112 (as depicted in interface 108*a*), the application integrator 106 can request interpretation of sub-document A, which in turn can cause interpretation of link A 114 and sub-document B (as described above). Interpretation of the link A 114 and the sub-document B can retrieve the updated price for ware X ($15) for display in the sub-document A.

Similarly, changes made to the data from sub-document B regarding prices for wares X-Z as displayed in sub-document A in interface 108a can be automatically reflected in the sub-document B in interface 108b. For instance, if the price for ware Y is changed from $12 to $8 in interface 108a, the sub-document B in interface 108b can automatically reflect the updated price ($8).

Sub-documents can include links to data from multiple different sub-documents within the document collection of various document types. For example, the sub-document A also includes link B 116 to slides for wares X-Z from sub-document N. Similar to providing the linked-to cells for link A 114, the linked-to slides for link B 116 can be provided through the application integrator 106 and the presentation application 104n (an application configured to interpret sub-document N). Changes to the slides in the interface 108c for sub-document N can be reflected in the corresponding slides linked-to by the link B 116.

In addition to integrating the applications 104a-n to provide access to the document collection, the application integrator 106 can be configured to integrate common operations performed by the applications 104a-n. For example, the application integrator 106 can maintain a common undo/redo stack (a data structure configured to store an ordered list of operations to follow for "undo" and/or "redo" features) for the document collection such that undo and/or redo operations for each of the sub-documents 110a-n are included in the common stack. Using a common stack for undo/redo operations, a user can accurately undo or redo his/her recent changes to the document collection as a whole, instead of to individual sub-documents. In another example, the application integrator 106 can maintain common information regarding revisions (e.g., track changes feature) for the document collection such that revisions to each of the sub-documents 110a-n are included in the common information. In a further example, the application integrator 106 can maintain a common chat log(e.g., instant messaging log) for the document collection such that a chat performed while accessing a first sub-document will continue without interruption if a user switches to accessing a second sub-document.

The computer system 102 that provides the document collection can be any of a variety of computer systems, such as a stand-alone computing device (e.g., a desktop computer, a laptop, a mobile computing device, etc.), a client-server computing system (e.g., a client computing device connected to a server over a network), etc. In a client-server computing system, execution of the applications 104a-n and the application integrator 106 can be provided "in the cloud"—distributed across a client computing device and/or one or more servers. An example client-server computing system is described in further detail below with regard to FIG. 1B.

Although the interfaces 108a-c are presented as depicting one sub-document at a time in the sub-document display area 112, a document collection can be provided to display more than one sub-document at a time. For example, the sub-document A and the sub-document B can be presented together in the sub-document display area 112.

FIG. 1B depicts an example client-server system 150 for providing a document collection. The client-server system 150 includes a server-side computer system 152 (e.g., one or more servers) and a client-side computer system 154 (e.g., a desktop computer, a laptop computer, a netbook computer, a mobile phone, etc.) that interact to provide a document collection on a client computing device. The server-side computer system 152 and the client-side computer system 154 can be configured to provide the client-side computer system 154 with cloud-based access to a document collection. For example, the server-side and client-side computer system 152 and 154, respectively, can interact over any of a network (e.g., a local area network (LAN), a virtual private network (VPN), the Internet, a wireless network, etc.) such that a portion of the processing associated with displaying the document collection is performed by the server-side computer system 152 and a portion is performed by the client-side computer system 154.

The server-side computer system 152 includes an application integration server system 156 and application server systems 158a-n. The application integration server system 156 is configured to integrate sub-documents provided by the application server system 158a-n into a document collection. The application integration server system 156 can perform operations similar to those described above with regard to the application integrator 106. The application integration server system 156 can include one or more computing devices configured to operate as servers.

The application server systems 158a-n is depicted as including an application A server system 158a, an application B server system 158b, and an application N server system 158n. The application server systems 158a-n are configured to execute applications for interpreting sub-documents. For example, the application A server system 158a is configured to execute an application A (e.g., a word processor application, a spreadsheet application, etc.). The application server systems 158a-n are further configured to provide information regarding interpretation of sub-documents to the application integration server system 156 for integration into a document collection. The application server systems 158a-n can perform operations similar to those described above with regard to the applications 104a-n.

Each of the application server systems 158a-n can include one or more computing devices configured to operate as servers. For example, the application A server system 158a can include a first group of servers dedicated to serving requests related to application A and the application B server system 158b can include a second, different group of servers dedicated to serving requests related to application B. In some implementations, one or more of the application server systems 158a-n and the application integration server system 156 are provided over common computing devices, such as a distributed server system.

The application integration server system 156 is depicted as storing information 160 for a document collection. The information 160 for the document collection includes information 162a-c identifying sub-documents S1-S3 as being part of the document collection and an access control list 164 for the document collection. The information 162a-c is depicted as including a name for the sub-document, a document type for the sub-document, and an identifier for the sub-document (e.g., a non-address identifier). For example, the information 162a corresponds to sub-document S1 and indicates that sub-document S1 is a type A document and has an identifier of "id1." The identifiers that are part of the information 162a-c (e.g., "id1") can be non-address identifiers.

The access control list 164 for the document collection can identify entities (e.g., users, user groups, organizations, etc.) that are permitted to access the document collection using the server-side computer system 152. Permissions designated for the document collection using the access control list 164 can be configured to extend to each of the sub-documents S1-S3 that are part of the document collection. For example, a user that is granted permission to view the document collection through the access control list 164 can receive access each of the sub-documents S1-S3 that are part of the document collection. Permissions can also be designated for sub-sets of a document collection, such as permission for sub-documents (e.g., user A has permission to access sub-documents S1 and S2), portions of sub-documents (e.g., user B has permission to access cells A1-B7 of sub-document S1), etc.

The information 160 for the document collection can be associated with a unique identifier (e.g., non-address identifier) for the document collection such that it can be readily identified and retrieved when requests and/or responses related to the document collection are received by the application integration server system 156.

The application A server system 158a is depicted as storing sub-document S1 166a and sub-document S3 166c, and the application B server system 158b is depicted as storing sub-document S2 166b. As provided in the document collection information 160, the sub-documents S1 166a and S3 166c are type A documents which can be interpreted by the application A on the application A server system 158a. Similarly, the sub-document S2 166b is a type B document which can be interpreted by the application B on the application B server system 158b.

The application integration server system 156 is depicted as communicating with the application server systems 158a-n with server requests 167a. The server requests 167a (e.g., network transmission packets) are depicted as including the document collection id and the sub-document id to which the request pertains. For example, if the application integration server system 156 receives a request from the client-side computer system 154 for access to the sub-document S1, the application integration server system 156 can transmit a request 167a to the application A server system 158a that includes the document collection id and the "id1" for the sub-document S1. The application A server system 158a can include the same information (document id and sub-document id) in a response 167b provided to the application integration server system 156.

The client-side computer system 154 includes a document collection manager 168 and sub-document modules 170a-c. The document collection manager 168 can act as a client-side counterpart to the application integration server system 156. For example, the document collection manager 168 can include instructions and data for displaying an interface for the document collection on the client-side computer system 154 that integrates the sub-documents of the document collection (e.g., instructions for displaying the interface 108a with the selectable tabs 110a-c).

The sub-document modules 170a-c correspond to the sub-documents S1-S3, respectively, which are part of the example document collection. The sub-document modules 170a-c contain instructions and data for providing an interface for the corresponding the sub-document as part of the document collection on the client-side computer system 154. For instance, the sub-document S1 module 170a can include instructions to display sub-document S1 (based on data received from the server-side computer system 152), to monitor events (e.g., mouse click event, keystroke event, selection event, etc.) related to the sub-document S1, and to transmit received events to the server-side computer system 152 for subsequent processing by the application A (the application configured to interpret the sub-document S1). The sub-document S1 module 170a can also include data relating to the sub-document S1, such as content data for the sub-document S1 (e.g., ware price data for example sub-document B depicted in FIG. 1A), formatting information for the document (e.g., font information, text size information, etc.), etc.

For example, assume that the client-side computer system 154 is using a web browser (e.g., INTERNET EXPLORER, MOZILLA FIREFOX) to access and display the document collection from the server-side computer system 152. The document collection manager 168 and the sub-document modules 170a-c can be JavaScript objects that are provided as JavaScript code by the server-side computer system 152. When executed on the client-side computer system 154, the sub-document modules 170a-c can provide interfaces (e.g., iframe elements, div elements, etc.) that display corresponding sub-documents S1-S3. The document collection manager 168 can provide an interface that integrates the interfaces of the sub-documents in the web browser and that permits a user to perform document collection-related tasks (e.g., toggle between sub-documents, link data between sub-documents, etc.). For instance, the interface of the provided by the document collection manager 168 can include selectable tabs (e.g., selectable tabs 110a-n), selection of which, can cause interfaces corresponding to the sub-documents to be displayed or hidden.

The document collection manager 168 includes a document collection identifier 172, document collection data 174, a network multiplexer 176, and common libraries, files, data, etc. 178. The document collection identifier 172 can be a non-address identifier that uniquely identifies the document collection. The document collection identifier 172 can be included in requests that are sent to and/or received from the server-side computer system 152 regarding the document collection, such as request 179a sent to the server-side computer system 152 and response 179b received from the server-side computer system 152. The document collection identifier 172 can be the same identifier used to identify the document collection by the server-side computer system 152 (e.g., used in server requests 167a and responses 167b). As described in more detail below, the request 179a and/or the response 179b can include a sub-document identifier when the subject of the transmission regards a sub-document (e.g., communication with regard an event generated for one of the sub-documents S1-S3).

The document collection data 174 can include data regarding the document collection, such as information identifying the sub-documents S1-S3 as being part of the document collection, formatting and configuration data for the document collection, data regarding links between the sub-documents S1-S3, etc. The document collection data 174 can be used to display the document collection on the client-side computer system 154.

The network multiplexer 176 can be configured to intercept network transmissions from the sub-document modules 170a-c that are intended for the server-side computer system 152. Intercepted transmissions can include a sub-document identifier (e.g., a non-address identifier for a sub-document). The intercepted transmissions can be modified by the network multiplexer 176 to also include the document collection identifier 172 and can then be transmitted to the server-side server system 152.

The sub-document modules 170a-c can be configured to operate independent of a specific document collection. From the perspective of a sub-document module, the sub-document module may not be aware that it is operating as part of a specific document collection and may not include the document collection identifier 172. The network multiplexer 176 can ensure that transmissions sent to the server-side computer system 152 include the correct identifier for the document collection (e.g., the document collection identifier 172). Such independent sub-document modules can permit for sub-documents to be easily added and removed from a document collection. For example, if a new sub-document is added to the document collection, a corresponding sub-document module can simply be provided to the client-side computer system 154 and integrated into the document collection by the document collection manager 168.

The common libraries, files, and data 178 for the document collection manager 168 include information that may be common to the document collection manager 168 and/or the sub-document modules 170a-c. For example, the common libraries, files, and data 178 can include cascading style sheets (CSS), JavaScript code for common features (e.g., menus, objects), images, etc. The sub-document modules 170a-c can be configured such that references to common libraries, files, and data resolve to the common libraries, files, and data 178 that are part of the document collection manager 168.

The sub-document modules 170a-c include sub-document identifiers 180a-c; sub-document data 182a-c; and libraries, files, and data 184a-c for an application that is configured to interpret the corresponding sub-document (based upon the sub-document's document type). The sub-document identifiers 180a-c can be non-address identifiers for each of the sub-documents S1-S3 corresponding to the sub-document modules 170a-c. The sub-document identifiers 180a-c can be included in requests that are transmitted to the server-side computer system 152 by the sub-document modules 170a-c (e.g., requests related to events generated for a corresponding sub-document displayed on the client-computer system 154). For instance, the sub-document identifiers 180a-c can be included in server requests 186a-c that are provided to the document collection manager 168 by the sub-document modules 170a-c. The sub-document identifiers 180a-c can also be included in responses received from the server-side computer system 152 and provided to the sub-document modules 170a-c by the document collection manager 168.

The sub-document data 182a-c can include a variety of data related to the corresponding sub-document S1-S3, such as content data for the sub-documents S1-S3 (e.g., ware price data for example sub-document B depicted in FIG. 1A), formatting information for the sub-documents S1-S3 (e.g., font information, text size information, etc.), etc. The libraries, files, and data 184a-c for each of the sub-document modules 170a-c can be for an application that is configured to interpret the corresponding sub-document S1-S3. For example, the libraries, files, and data 184a of sub-document module 170a relate to application A, which, in this example, is the configured to interpret the sub-document S1 (which is a document of type A).

The libraries, files, and data 184a-c can include a variety of information for providing the corresponding sub-document, as interpreted by the corresponding application (e.g., application A interpreting sub-document S1), as part of the document collection on the client-side computer system 154. For example, the libraries, files, and data 184a can include instructions for interpreting the sub-document data 182a for display on the client-side computer system 154 and for handling events relating the sub-document according to application A. For instance, the application A may handle a click-and-drag event differently than the application B. The libraries, files, and data 184a can be configured to handle the click-and-drag event according to application A (e.g., select an area of text in a word processor document, etc.) and the libraries, files, and data 184b can be configured to handle click-and-drag events according to application B (e.g., select a range of cells in a spreadsheet).

The libraries, files, and data 184a-c can be configured to perform some processing associated with some features of applications A and B locally on the client-side computer system 154 and to transmit server requests 186a-c (using the document collection manager 168) to the server-side computer system 152 for processing related to other features of applications A and B. The split among the features processed locally on the client-side computer system 154 and the features processed on the server-side computer system 152 can vary depending on a variety of factors (e.g., client-side computer system 154 processing resources, network connection speed, server-side computer system 152 processing resources, etc.). For example, as the client-side computer system's 154 processing resources (e.g., available processor bandwidth, available random access memory (RAM), etc.) decrease, the sub-document modules 170a-c (through the libraries, files, and data 184a-c) can be configured to use the server-side computer system 152 to perform processing associated with a greater number of features for applications A and B.

The document collection manager 168 and the sub-document modules 170a-c can be implemented on the client-side computer system 154 in a variety of ways. For instance, the document collection manager 168 and the sub-document modules 170a-c can be provided as part of a standalone thin client application (e.g., CITRIX client application) that is configured for execution on the client-side computer system 154. In another example, the document collection manager 168 and the sub-document modules 170a-c can be implemented by a pre-existing client application (e.g., a web browser application) that is adapted to instantiate and execute the document collection manager 168 and the sub-document modules 170a-c. For instance, the server-side computer system 152 can provide a web browser running on the client-side computer system 154 with code (e.g., JavaScript code, SHOCKWAVE FLASH code, etc.) that can be executed by client-side computer system 154 to instantiate the document collection manager 168 and the sub-document modules 170a-c.

The server-side computer system 152 can provide the client-side computer system 154 with sub-document modules 170a-c as needed. For example, if the sub-document S1 is initially displayed on the client-side computer system 154 for the document collection, of the sub-document modules 170a-c, the client-side computer system 154 may include only an instance of the corresponding sub-document module 170a. As the other sub-documents S2-3 are accessed as part of the document collection, the other sub-document modules 170b-c can be provided to the client-side computer system 154 by the server-side computer system 152. Such modularity among the sub-documents can allow for document collections to be initially loaded and executed more quickly on the client-side computer system 154 (e.g., the client-side computer system 154 can be ready to process user input for the document collection once the sub-document module 170a has been received and executed, instead of having to wait for the other sub-document modules 170b-c to have also been received and executed).

Figure 2:
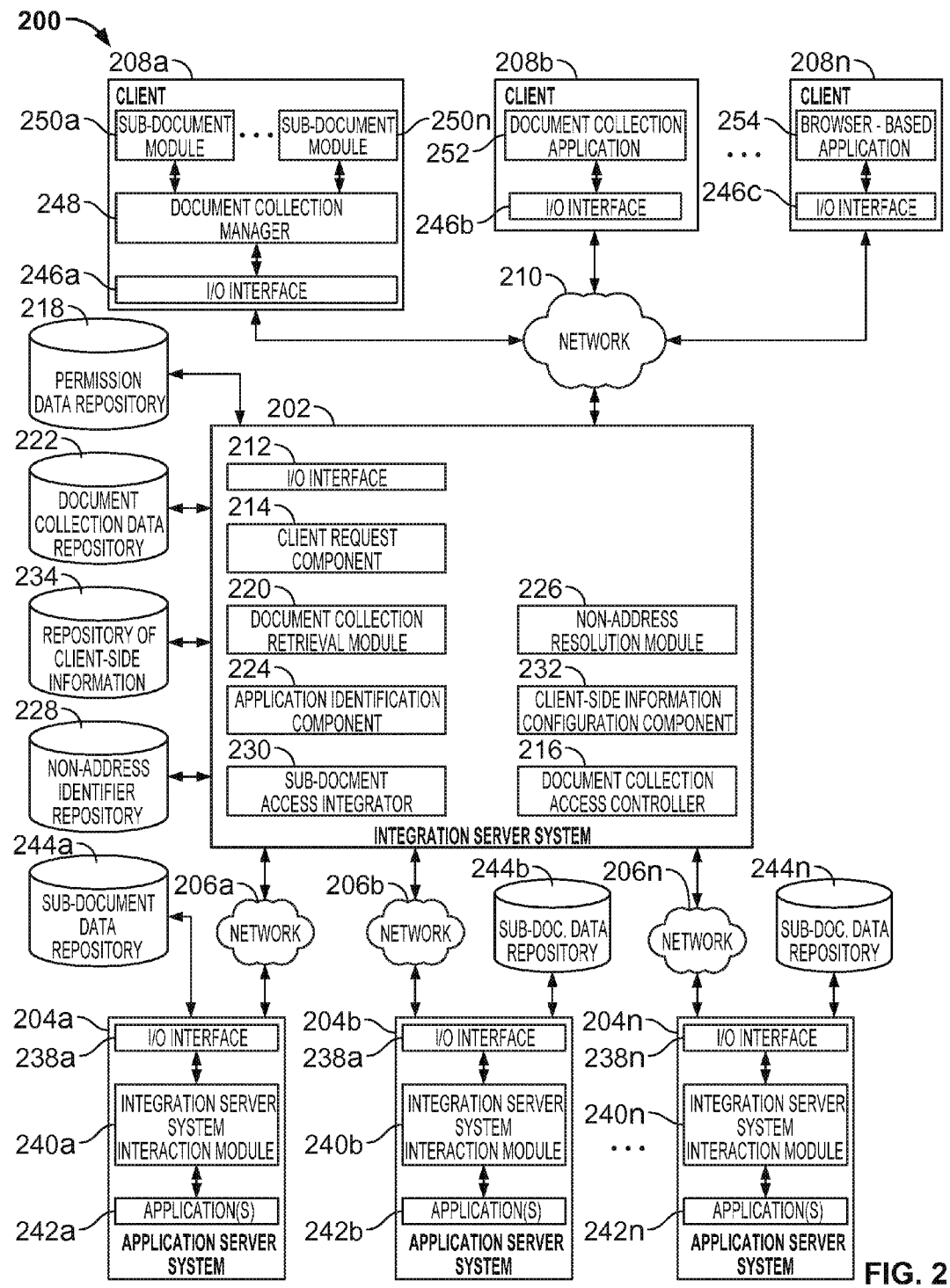
FIG. 2 is a diagram of an example system for providing an electronic document collection to a client computing device.

FIG. 2 is a diagram of an example system 200 for providing an electronic document collection to a client computing device. The example system 200 is depicted as including an integration server system 202 that is configured to provide access to a document collection that includes a variety of sub-documents, similar to the application integrator 106 and the application integration server system 152 described above with regard to FIGS. 1A-B.

The application integration server system 202 can communicate with application server systems 204a-n (similar to application server systems 158a-n described above with regard to FIG. 1B) through various networks 206a-n (e.g., fiber-optic network, wireless network, LAN, wide area network (WAN), combinations thereof, etc.). The application server systems 204a-n can each execute one or more applications that are configured to interpret sub-documents, in whole or in part, that are of a defined document type. For example, the application server system 204a can be configured to execute a spreadsheet application and a word processor application that are configured to interpret spreadsheet type sub-documents and word processor type sub-documents, respectively.

A variety of clients 208a-n (e.g., desktop computer, laptop computer, mobile phone, smart phone, netbook, etc.) can receive access to document collections through the integration server system 202 through network 210. The clients 208a-n can be similar to the client-side computer system 154, as described above with regard to FIG. 1B, and can be provided with access to document collections in a manner similar to the client-side computer system 154, as described above with regard to FIG. 1B. The network 210 can be similar to, and/or part of, the networks 206a-n used to connect the integration server system 202 with the application server systems 204a-n.

In the example system 200, the client 208a can request access to a document collection from the integration server system 202 through the network 210. The integration server system 202 can receive the request at an input/output (I/O) interface 212 (e.g., Ethernet card, wireless modem, etc.) that is part of the integration server system 202. The I/O interface 212 can provide the request to a client request component 214 that is configured to route the request to an appropriate component of the integration server system 202 and/or the application server systems 204a-n. For example, for an initial request to access a document collection, the integration server system 202 can provide the request to a document collection access controller 216 that is configured to authenticate a client 208a-n and/or a user of the client 208a-n to access the requested document collection.

The document collection access controller 216 can be configured to restrict access to a document collection and/or its sub-documents based upon associated permissions stored in a permission data repository 218 (e.g., a database, a file system, etc.) that is accessible by the integration server system 202. The permission data repository 218 can provide permissions associated with document collections and a variety of sub-units of document collections (e.g., sub-documents, data within sub-documents, etc.). The permission data repository 218 can store information related to entities that are permitted to access a document collection, such as users, clients 208a-n, internet domains associated with the clients 208a-n, etc. Using the permission data repository 218, the document collection access controller 216 can authenticate a request to access a document collection (e.g., verify a username and password for a user that is permitted to access the document collection).

Once authenticated, the integration server system 202 can provide the received request to a document collection retrieval module 220 that is configured to retrieve information associated with a document collection, such as the document collection information 160 described above with regard to FIG. 1B. The document collection retrieval module 220 can retrieve document collection information from a document collection data repository 222 (e.g., a database, a file system, etc.) that is accessible by the integration server system 202. As illustrated by example document collection information 160, the document collection information can include a variety of information regarding a document collection, such as information regarding sub-documents that are part of the document collection (e.g., non-address identifiers, defined document type, name of sub-document, etc.), information regarding the document collection (e.g., default sub-document to display, information regarding links between sub-documents, configuration settings for the document collection, etc.), etc.

Using the retrieved document collection information, an application identification component 224, that is part of the integration server system 202, can identify applications that are configured to interpret sub-documents that are part of the requested document collection. For example, for a sub-document that is of a word processor document type, the application identification component 224 can identify an application that is configured to interpret a word processor document type (e.g., a word processor application). Using document types for the sub-documents provided in the retrieved document collection information and associations between applications and defined document types to identify applications that are configured to interpret the sub-documents, the application identification component 224 can identify applications that are configured to interpret the sub-documents of the document collection.

In implementations where the document collection information does not contain information regarding defined document types for the sub-documents, the application identification component 224 can use a non-address resolution module 226 to retrieve additional information for sub-documents (e.g., defined document type) based upon their non-address identifiers. The non-address resolution module 226 can access a non-address identifier repository 228 (e.g., a database, a file system, etc.) that is configured to store information regarding sub-documents that is retrievable using a sub-documents non-address identifier.

A sub-document access integrator 230 of the integration server system 202 is configured to use the retrieved document collection information and identified applications for interpreting sub-documents of a document collection to interact with the application server systems 204a-n to provide integrated access to document collections to the clients 208a-n. The sub-document access integrator 230 can be configured to operate similar to the application integrator 106 and/or the application integration server system 156, described above with regard to FIGS. 1A and 1B, respectively. For instance, the sub-document access integrator 230 can be configured to provide requests for application-related processing from the clients 208a-n to one or more of the application server systems 204a-n that are configured to perform the requested application-related processing. For instance, if the client 208a provides a request related to sorting a list of words (e.g., sort feature provided in word processor applications) in a first sub-document, the sub-document access integrator 230 can provide the request to one or more of the application server systems 204a-n that can run an application configured to perform the requested word sort (e.g., an application server system configured to execute a word processor application).

The sub-document access integrator 230 can also be configured to coordinate the integration of data from a first sub-document into a second sub-document through links (e.g., non-address identifier links). For example, if a first sub-document that is a word processor type document contains a link to cells from a second sub-document that is a spreadsheet type document, the sub-document access integrator 230 can provide a request to one or more of the application server system 204a-n to interpret at least the linked-to portion of the second sub-document (cells). Further regarding this example, the sub-document access integrator 230 can receive information regarding the linked-to cells as part of the first sub-document and can integrate the linked-to cells into the first sub-document (e.g., provide instructions to one or more of the application server systems 204a-n for including the linked-to cells in the first sub-documents, etc.).

The integration server system 202 can also include a client-side information configuration component 232 that is configured to provide information (e.g., code) to the clients 208a-n that can be used to provide document collections, in conjunction with the integration server system 202, on the clients 208a-n. For example, the client-side information configuration component 232 can provide the clients 208a-n with information that, when executed by the clients 208a-n, causes the clients to instantiate a document collection manager (e.g., document collection manager 168) and sub-document modules (e.g., sub-document modules 170a-n). The client-side information configuration component 232 can provide such information in conjunction with the application server systems 204a-n, which may be configured to provide information related to sub-documents (e.g., sub-document modules 170a-n) and/or applications (e.g., application libraries, files, data 184a-n).

The client-side information configuration component 232 can retrieve and store client-side information in a repository of client-side information 234 (e.g., a database, a file system, etc.). The time to serve requests from the clients 208a-n can be decreased by using pre and/or partially configured client-side information.

The application server systems 204a-n can include I/O interfaces 238a-n that are communicatively connected to the integration server system 202 through the networks 206a-n. Through the I/O interfaces, the application server systems 204a-n can receive requests from the integration server system 202 that are handled by integration server system interaction modules 240a-n. The integration server system interaction modules 240a-n can be configured to interact with the integration server system 202 with regard to requests from the clients 208a-n. For example, the integration server system interaction module 240a of the application server system 204a can transmit requests from the integration server system 202 to an appropriate application 242a (e.g., a word processor application, a spreadsheet application, etc.) for processing.

The application server systems 204a-n can each be configured to execute one or more applications 242a-n (e.g., presentation application, graphics application, etc.). In some implementations, the application server systems 204a-n can be configured to act as redundant systems, whereby each of the application server systems 204 is capable of executing each of the applications 242a-n. In such implementations, requests from the integration server system 202 can be provided to an application server system with available processing bandwidth.

In some implementations, each of the application server systems 204a-n can be configured to execute a limited set of applications. For example, the application server system 204a can be configured to execute a word processor application and a spreadsheet application, the application server system 204b can be configured to execute a presentation application, and the application server system 204n can be configured to execute a spreadsheet application and a graphics application.

The application server systems 204a-n can be configured to access sub-document data repositories 244a-n (e.g., database, file system, etc.). The sub-document data repositories 244a-n can be configured to store data associated with sub-documents, such as sub-document content (e.g., data in the cells of a spreadsheet sub-document), formatting information (e.g., font, text size), links to data contained in other sub-documents (e.g., links based on non-address identifiers), a current state of the sub-document (e.g., current cursor position, recent actions, etc.), etc.

The application server systems 204a-n can store the current state of sub-documents that are part of a document collection as edited by one or more of the clients 208a-n. For example, when a user of client 208a types in a cell of a spreadsheet sub-document, the application server system 204a can receive an indication of the typing from the client 204a through the integration server system 202, which can be recorded in the sub-document data repository 244a. Were the user to subsequently quit editing the spreadsheet sub-document with the client 208a and at a later time resume editing of the spreadsheet sub-document with the client 208b, the current state of the spreadsheet sub-document (with the recent typing) can be provided to the client 208b so that the user can proceed from where they left-off.

The clients 208a-n each including an I/O interface 246a-n that can be used to communicate with the integration server system 202 through the network 210. As depicted in the example system 200, various client-side implementations can be used. For example, client 208a is depicted as including a document collection manager 248 (similar to the document collection manager 168 described above with regard to FIG. 1B) and multiple sub-document modules 250a-n (similar to the sub-document modules 170a-n described above with regard to FIG. 1B).

In another example, the client 208b is depicted as including a document collection application 252 that is used to provide access to a document collection. The document collection application 252 can be any variety of applications configured to interact with the integration server system 202, such as a thin-client installed on the client 208b (e.g., a CITRIX client).

In a further example, the client 208n is depicted as including a browser-based application 254 that can be used and configured to interact with the integration server system 202 to provide access to a document collection on the client 208n. For example, the browser-based application 254 can receive code from the integration server system 202 (configured by the client-side information configuration component 232) that the browser-based application 254 can cause to be executed on the client 208n to display a document collection in the interface of the browser-based application 254. Various combinations of the client implementations 248-254 are possible (e.g., the browser-based application 254 can be configured to generate the document collection manager 248 and the sub-document modules 250a-n).

Figure 3A:
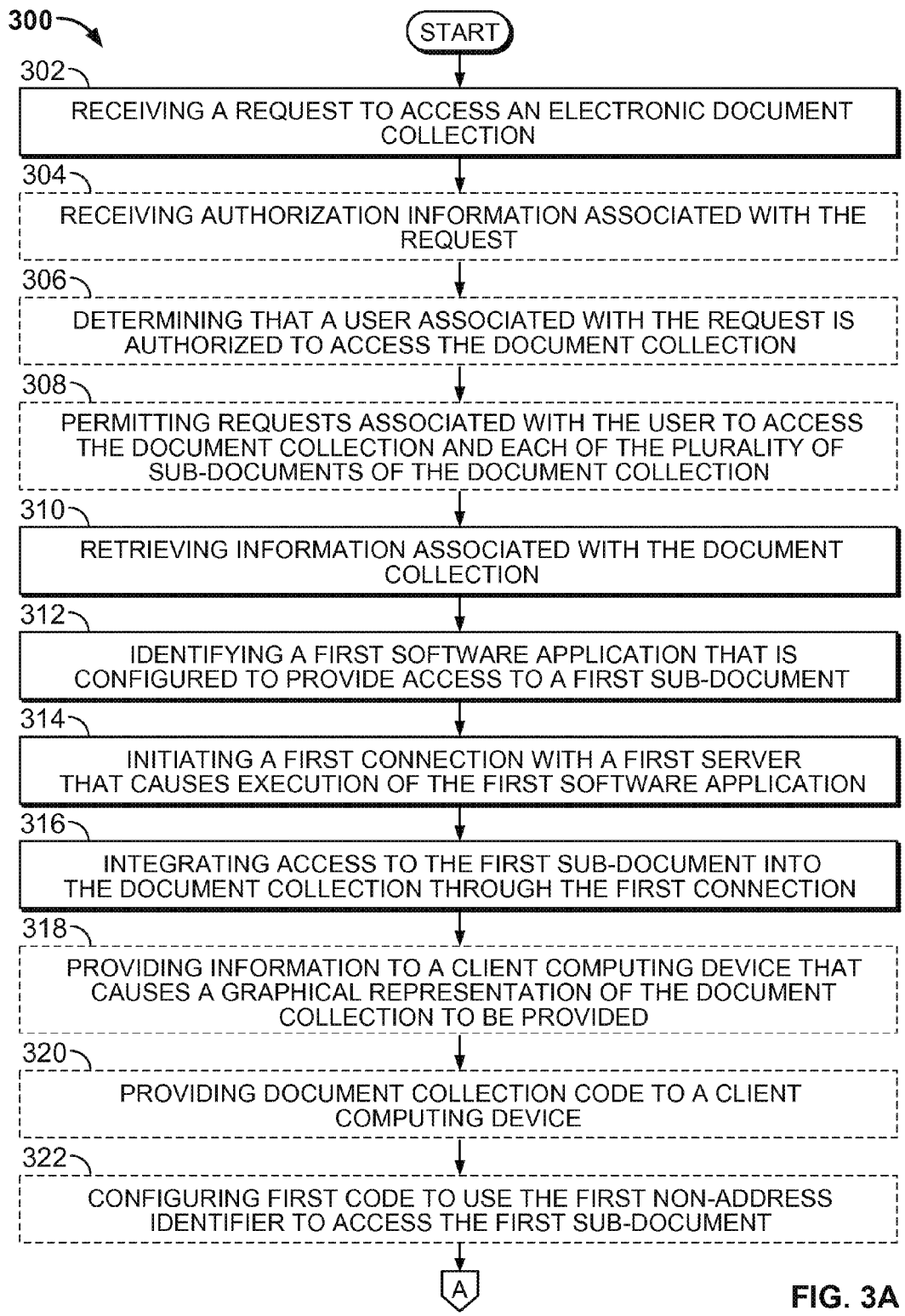
FIGS. 3A-B are flowcharts showing an example technique for providing access to an electronic document collection on a client computing device.
Figure 3B:
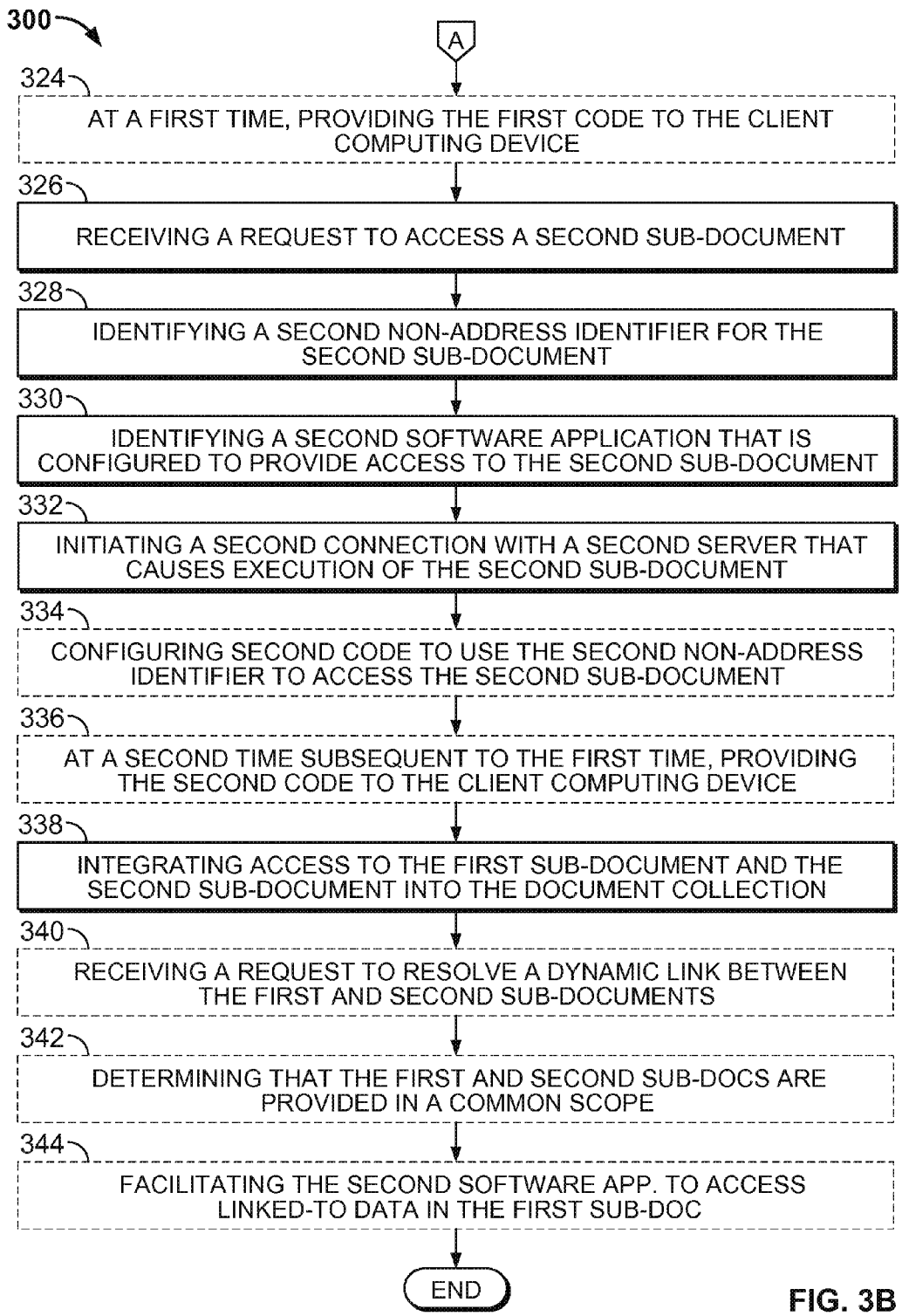

FIGS. 3A-B are flowcharts showing an example technique 300 for providing access to an electronic document collection on a client computing device. The example server-side technique can be performed by any of a variety of server systems, such as by the computer system 102, the server-side computer system 152, the application integration server system 156, and/or the integration server system 202, as described above with regard to FIGS. 1A-B and 2.

As depicted in FIG. 3A, the example technique 300 begins at step 302 by receiving a request to access an electronic document collection. For example, the integration server system 202 can receive a request from the client 208a to provide the client with access to a document collection.

In some implementations of the technique 300, authorization information (e.g., username, password, session id, etc.) associated with the request is received (step 304) and a determination that a user associated with the request is authorized to access the requested document collection is made (step 306). For example, the document collection access controller 216 of the integration server system 202 can cross-reference the received authorization information with information stored in the permission data repository 218 to verify that the user is authorized to access the requested document collection. Subsequent requests associated with the user to access the document collection and each of a plurality of sub-documents of the document collection can be permitted based upon the authorization (step 308). For example, a user authorized to access a document collection can be authorized to access each of the sub-documents of the document collection.

Information associated with the document collection can be retrieved (step 310). For example, the document collection information 160 can be retrieved by the application integration server system 156. A first software application that is configured to provide access to a first sub-document of the requested document collection can be identified (step 312). For example, based upon the retrieved document collection information 160, a spreadsheet application (e.g., MICROSOFT EXCEL) can be identified to interpret a spreadsheet type sub-document of the document collection.

A first connection with a first server that causes execution of the first software application can be initiated (step 314). For example, the integration server system 202 can transmit a request to the application server system 204a to interpret a sub-document of the document collection using the application 242a. Access to the first sub-document of the document collection can be integrated into the document collection through the first connection (step 316). For instance, the integration server system 202 can transmit information between the client 208a and the application server system 204a as being associated with the document collection such that the first sub-document is displayed on the client 208a as being part of the document collection.

In some implementations, information that causes a graphical representation of the document collection to be displayed on the client computing device can be provided to the client computing device (step 318). For example, the application integrator server system 156 can provide the client-side computer system 154 with information (e.g., a data stream, an HTML document, JavaScript code, CSS code, SHOCKWAVE FLASH files, etc.) to display a document collection in an interface on the client-side computer system 154 (e.g., the interface 108a).

Referring to FIG. 3B, in some implementation of the technique 300, document collection code can be provided to the client computing device (step 320). For example, the client-side computer system 154 can be provided with code from the server-side computer system 152 that, when executed by the client-side computer system 154, causes the document collection manager 168 to be instantiated. First code provided to the client computing device can be configured to use a first non-address identifier when accessing and submitting requests related to the first sub-document (step 322). For example, the client-side computer system 154 can be provided with code from the server-side computer system 152 that, when executed by the client-side computer system 154, causes the sub-document modules 170a-n to be instantiated with the corresponding sub-document identifiers 182a-n. The first code can be provided to the client computing device at a first time (step 324). For example, the code associated with sub-document A can be provided to a client computing device by the application integrator 106 in response receiving a request for access to the document collection.

A request to access a second sub-document can be received (step 326), a second non-address identifier for the second sub-document can be identified (step 328), a second software application configured to provide access to the second sub-document is identified (step 330), and a second connection with a second server that causes execution of the second sub-document can be initiated (step 332). For example, user selection of the tab 110b corresponding to sub-document B can cause a client device (e.g., client-side computer system 154) to request access to the sub-document B using a non-address identifier for the sub-document B (e.g., non-address identifier 182a-n). The application integration server system 156 can identify the non-address identifier from the request and use it to identify and request access from an appropriate application executed by an application server system 158a-n.

In some implementations, second code to use the second non-address identifier to access the second sub-document can be configured (step 334) and, at a second time subsequent to the first time, the second code can be provided to the client computing device (step 336). For example, the code associated with sub-document B can be provided to client computing device by the application integrator 106 in response to selection of the tab 110b corresponding to the sub-document B in interface 108b (which may be after the sub-document A of the document collection has already been viewed and edited).

Access to the first sub-document and the second sub-document can be integrated into the document collection (step 338). For example, the integration server system 202 can coordinate interactions with the application server system 204a-n and provide document collection-related information (e.g., data, code, etc.) to the clients 208a-n such that access to the sub-documents can be provided in an interface for the document collection.

In some implementations, a request to resolve a dynamic link between the first and second sub-documents can be received (step 340), a determination can be made that the first and second sub-documents are provided in a common scope (step 342), and access to the linked-to data in the first sub-document for the second software application can be facilitated (step 344). For example, when interpreting the sub-document A, the word processor application 104a may encounter link A 114a to cells from the sub-document B. The word processor application 104a can provide a request to the application integrator 106 for assistance in accessing the linked-to cells. The application integrator 106 can determine that the sub-document A and B are provided within a common scope of the document collection and, in response to the determination, submit a request to the spreadsheet application 104b to interpret the linked-to cells. In response, the spreadsheet application 104b can interpret the linked-to cells and provide interpreted data for the linked-to cells to the application integrator 106, which can provide the data to the word processor application 104a for integration into the sub-document A.

Figure 4A:
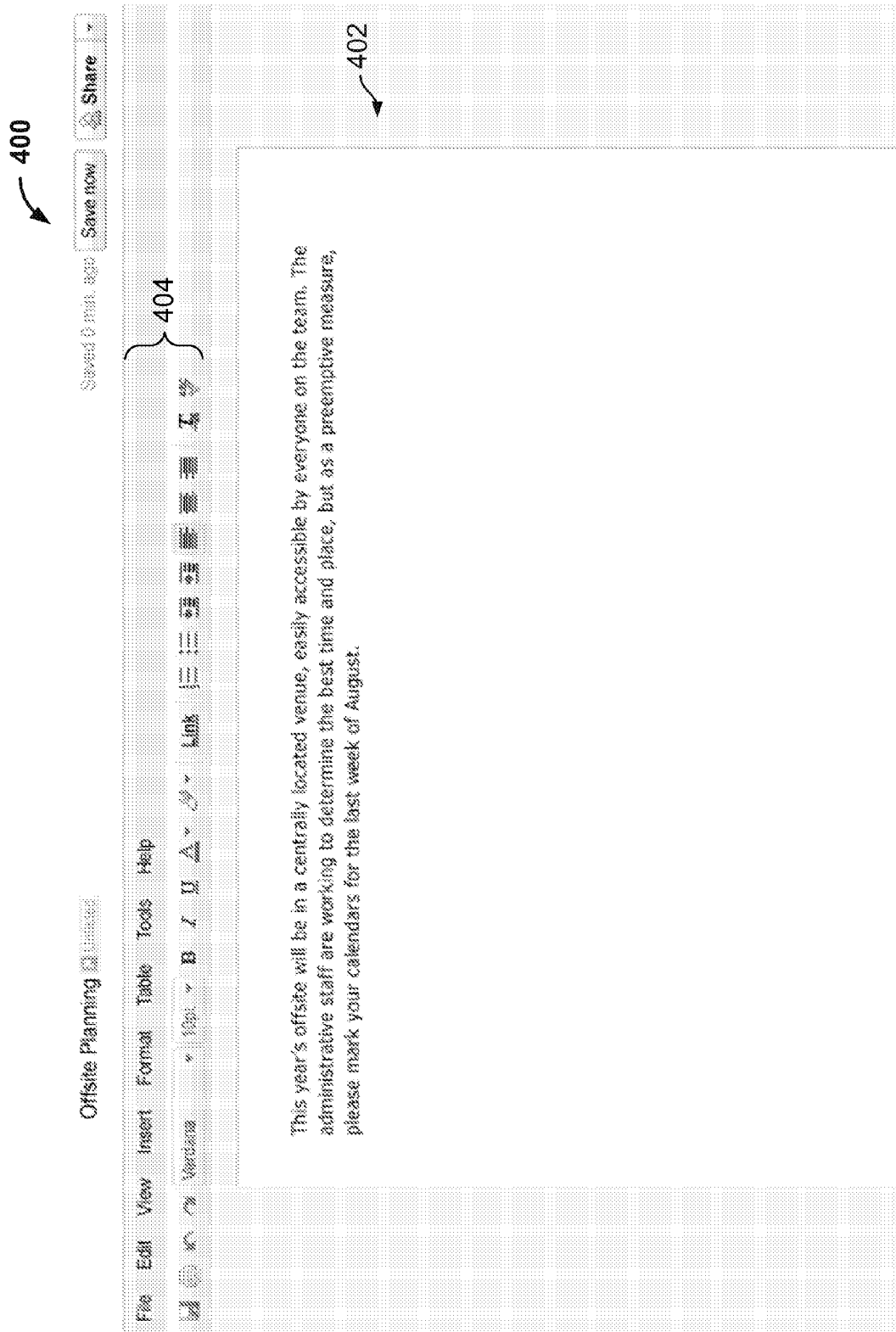
FIGS. 4A-O are screenshots of an example interface for providing an electronic document collection.
Figure 4B:
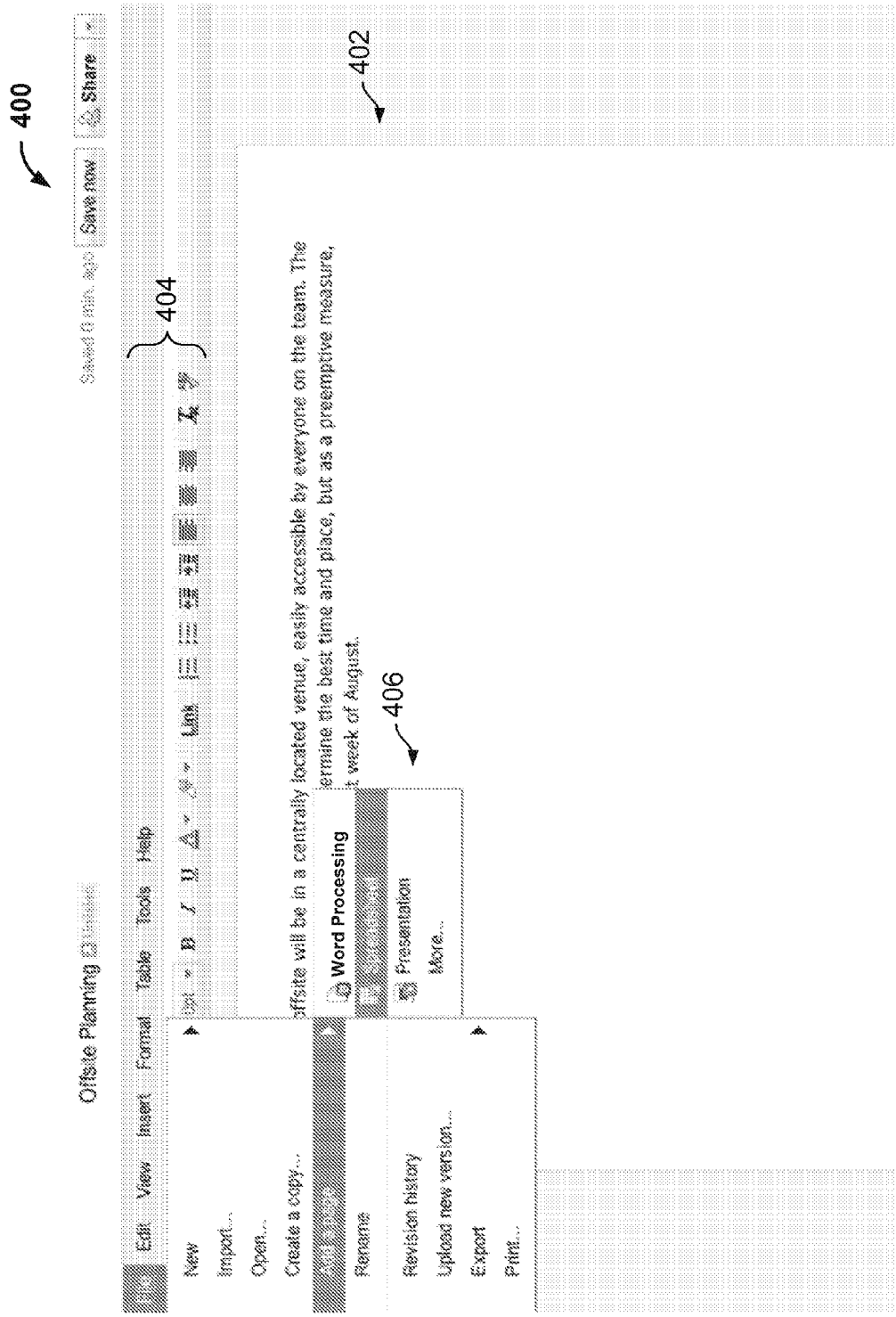
Figure 4C:
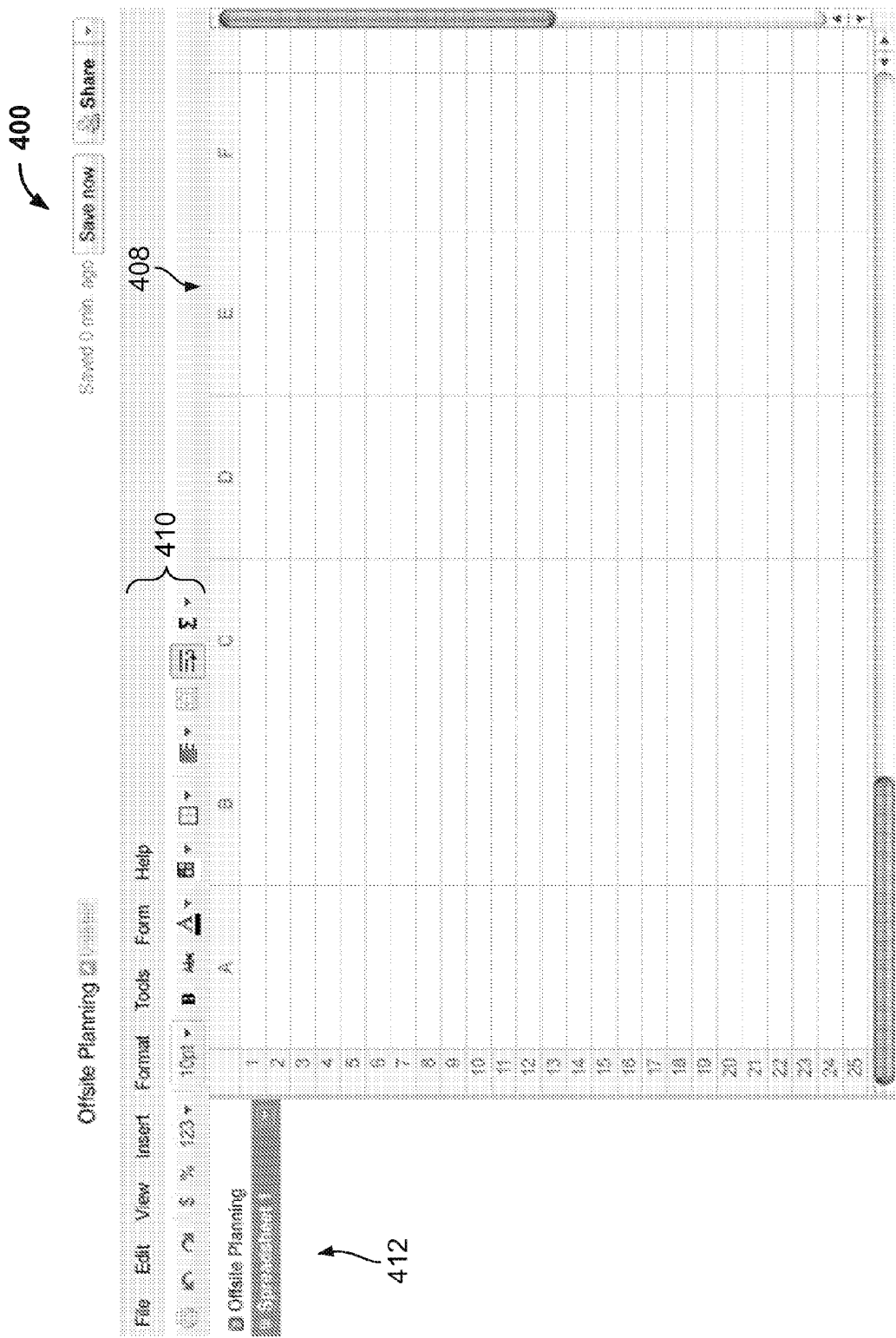
Figure 4D:
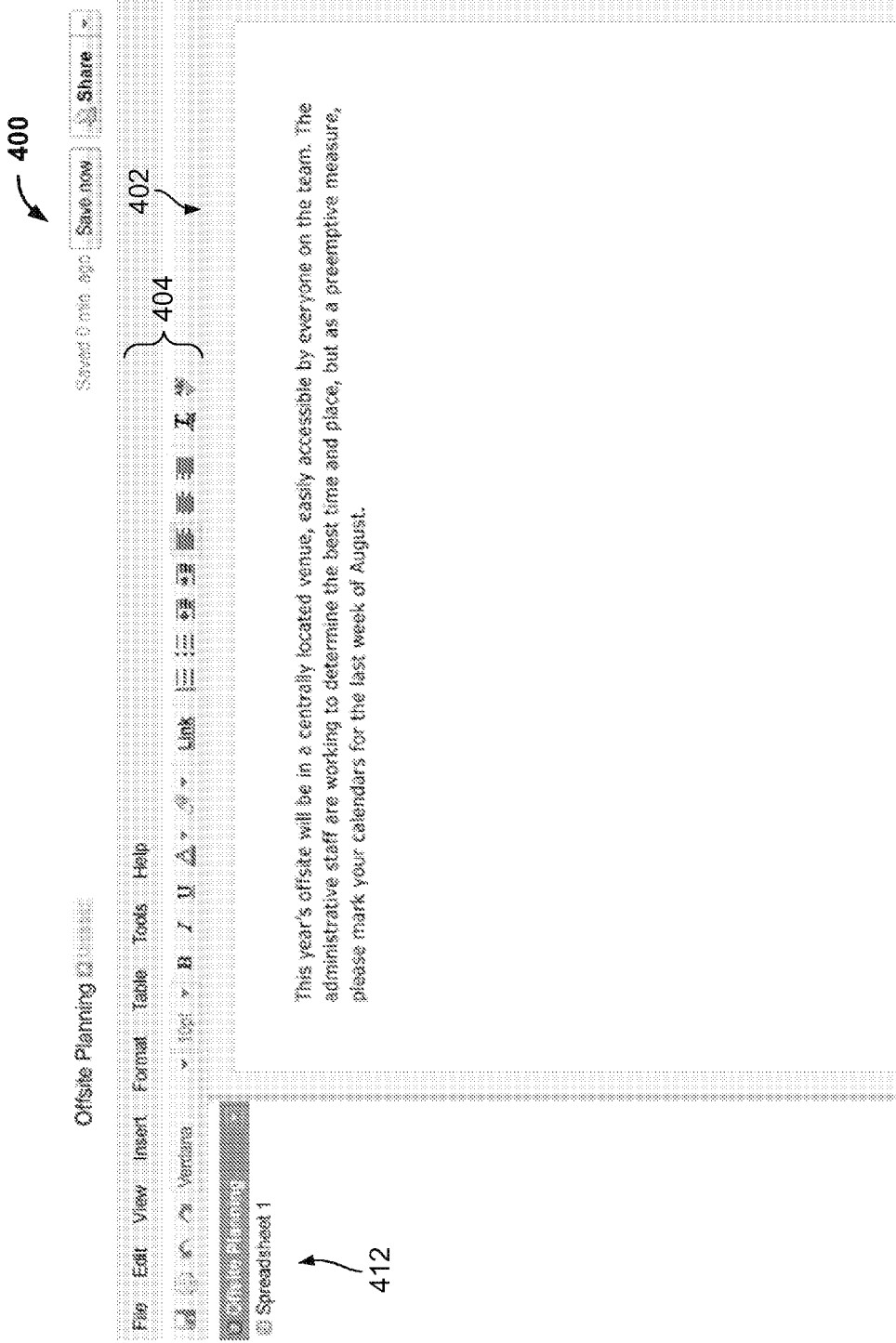
Figure 4E:
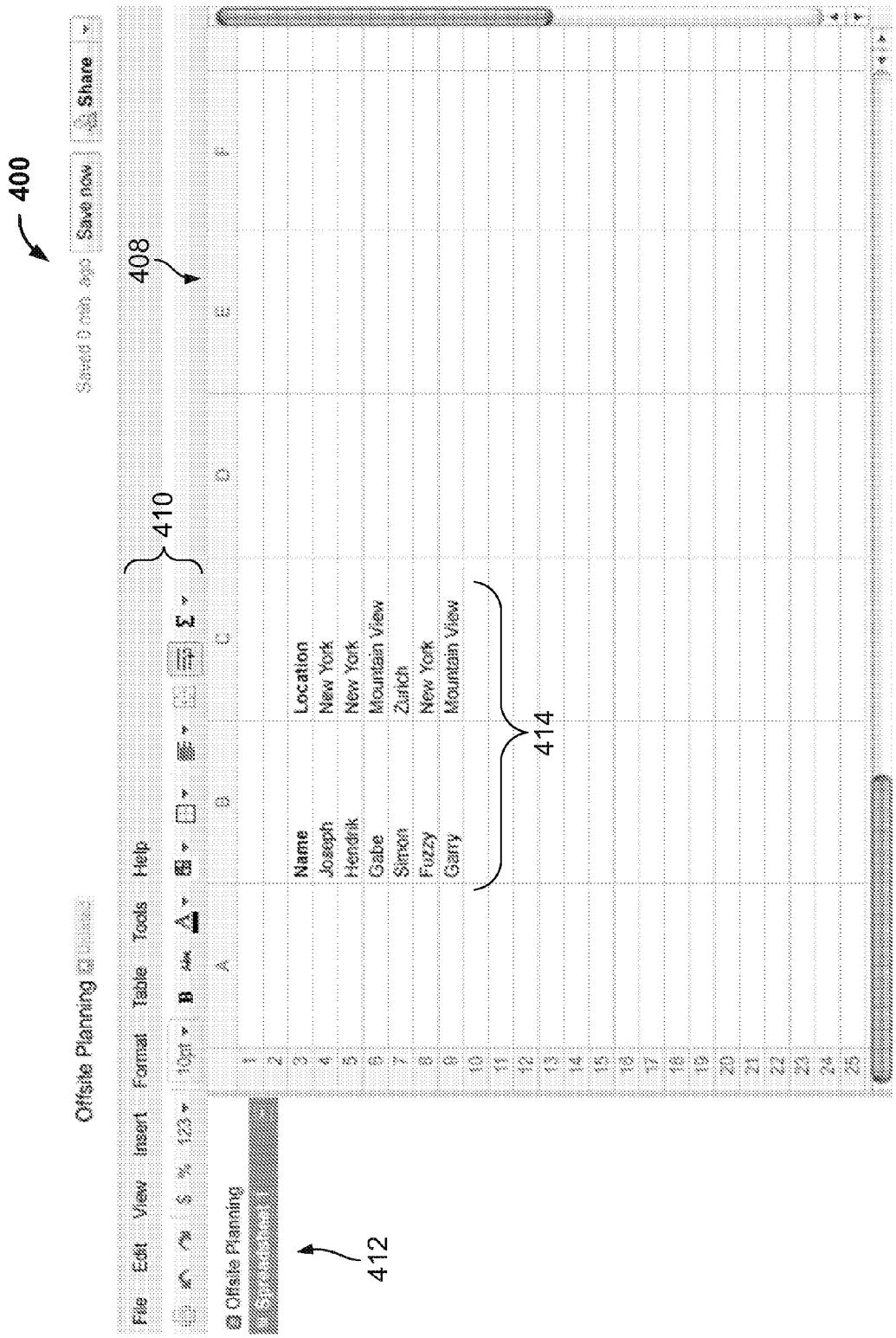
Figure 4F:
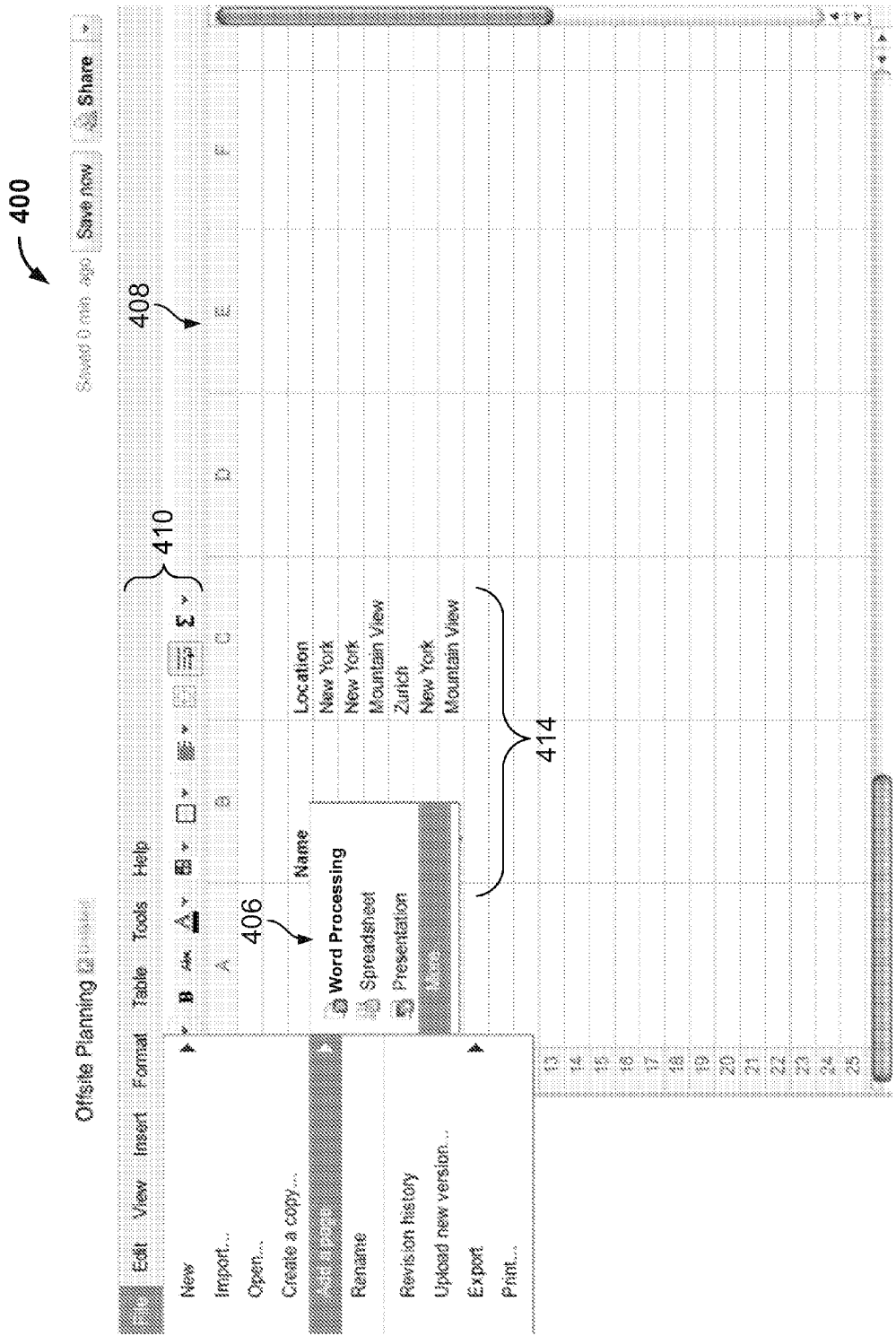
Figure 4G:
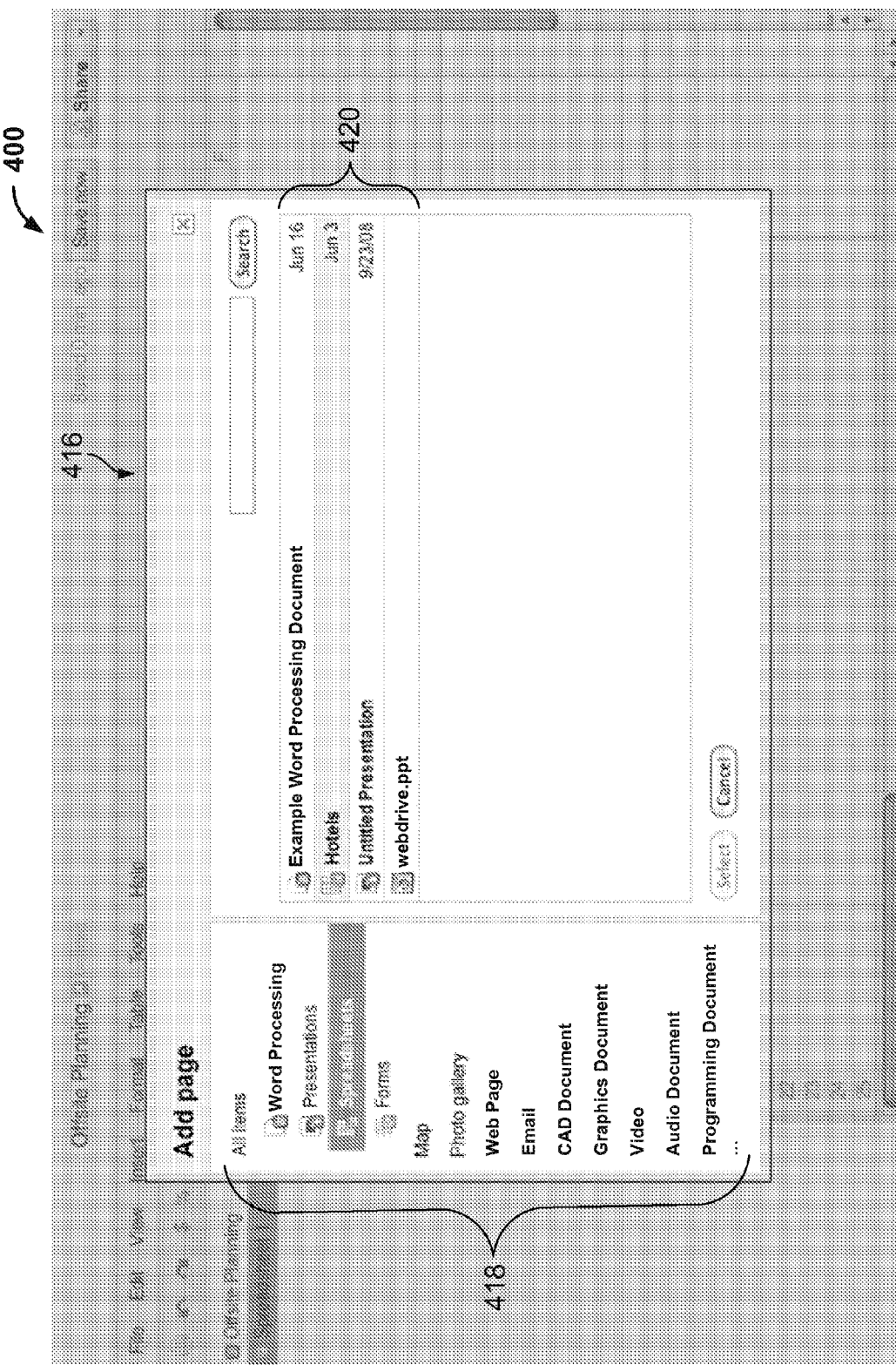
Figure 4H:
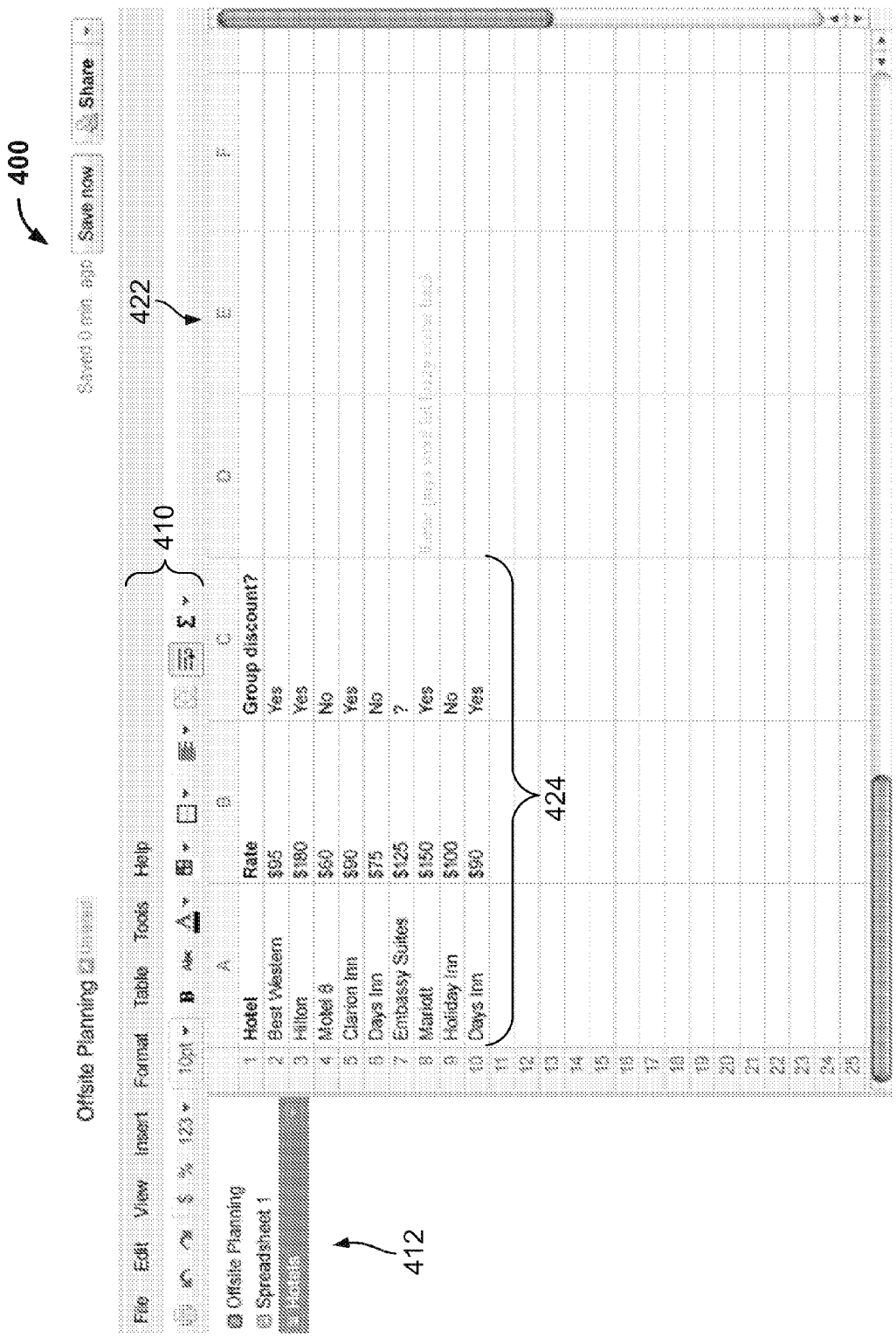
Figure 4I:
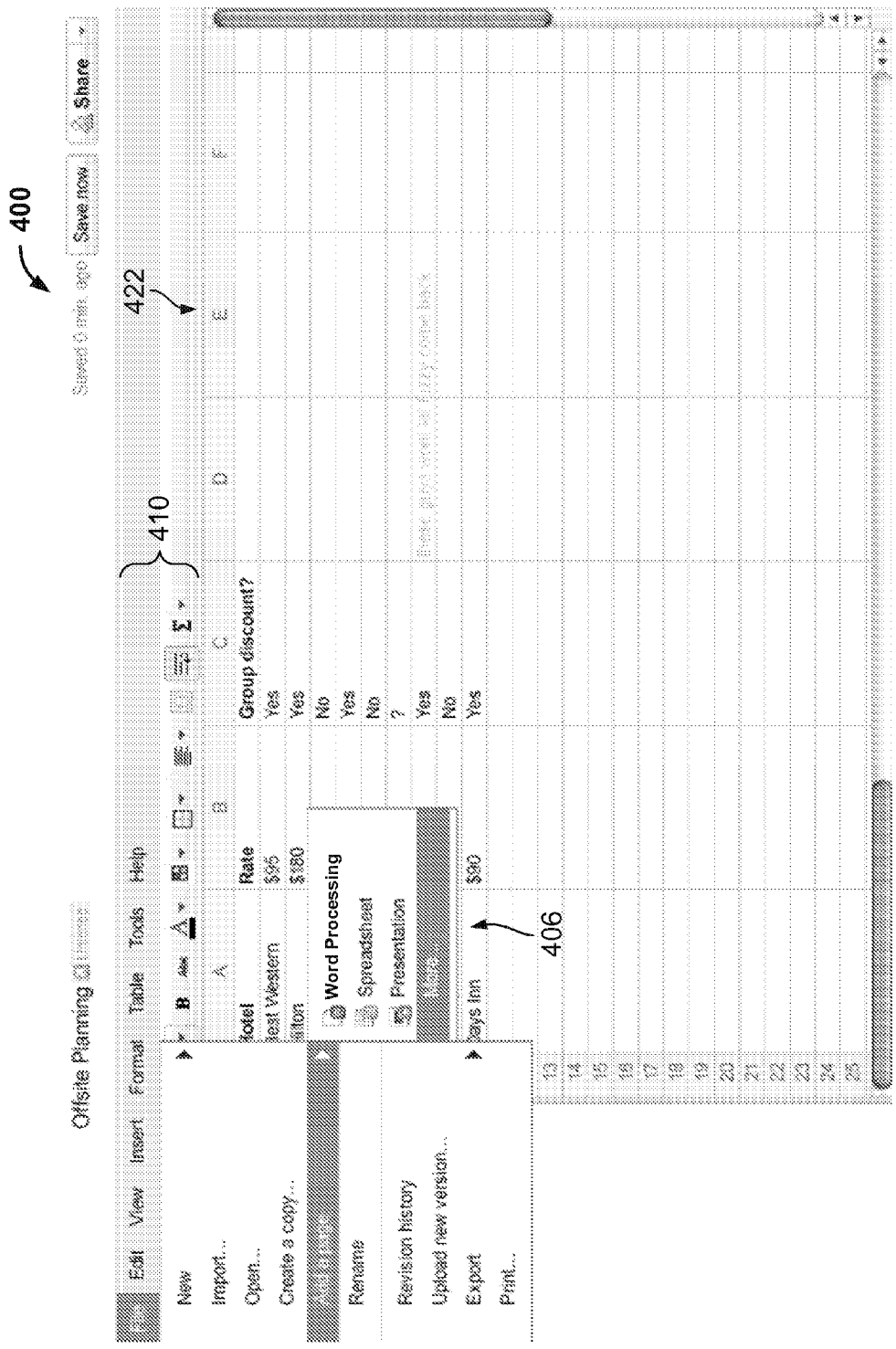
Figure 4J:
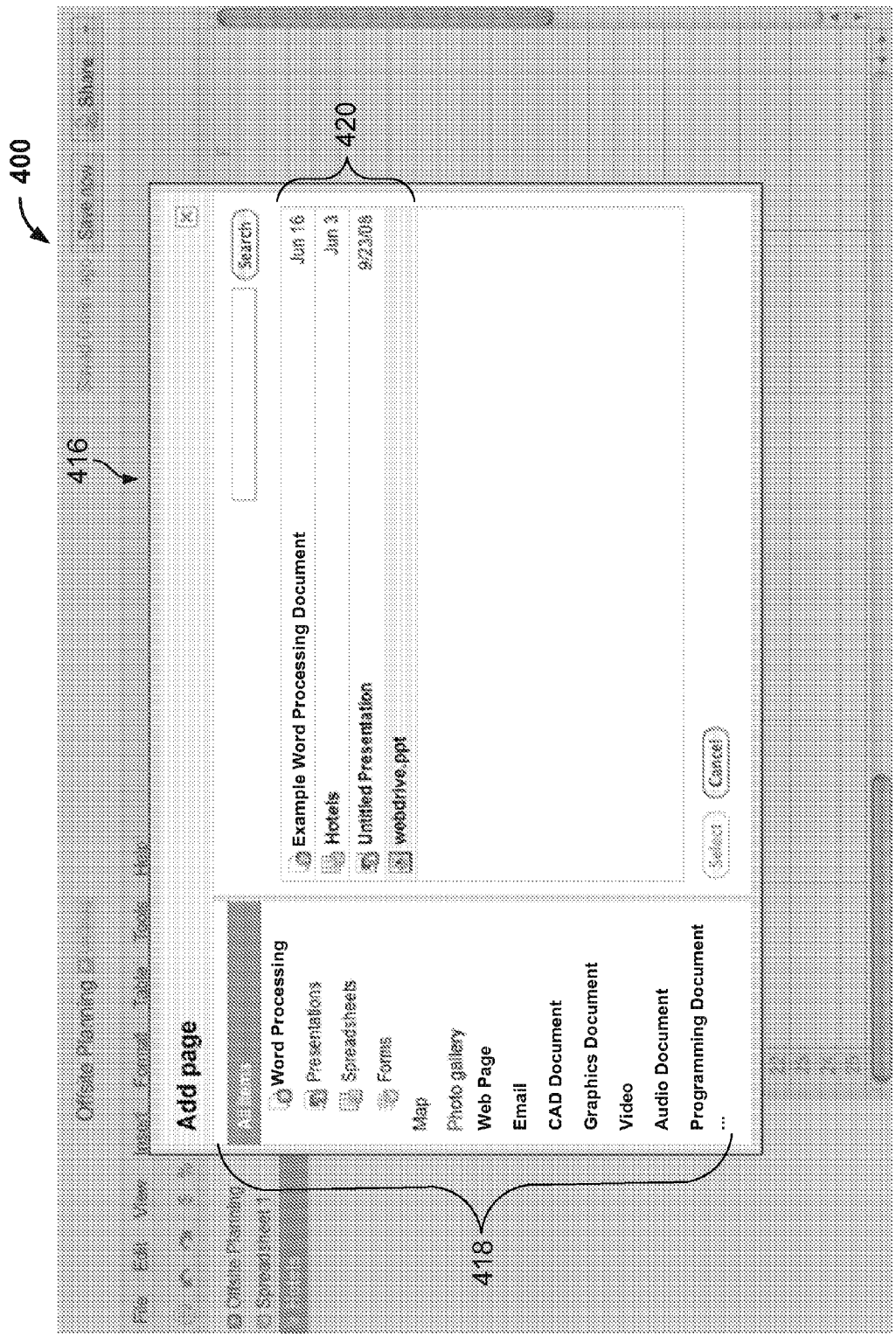
Figure 4K:
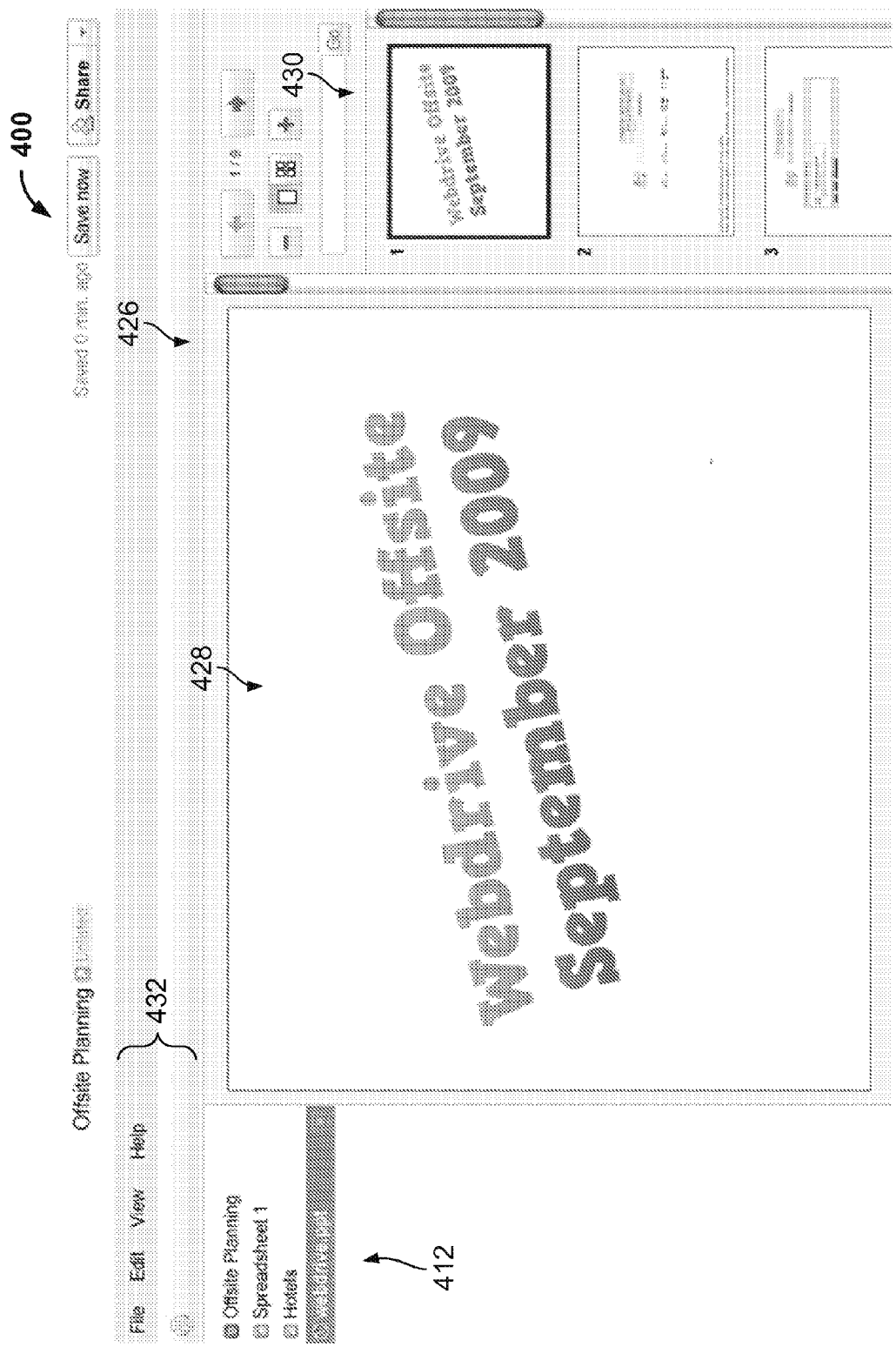
Figure 4L:
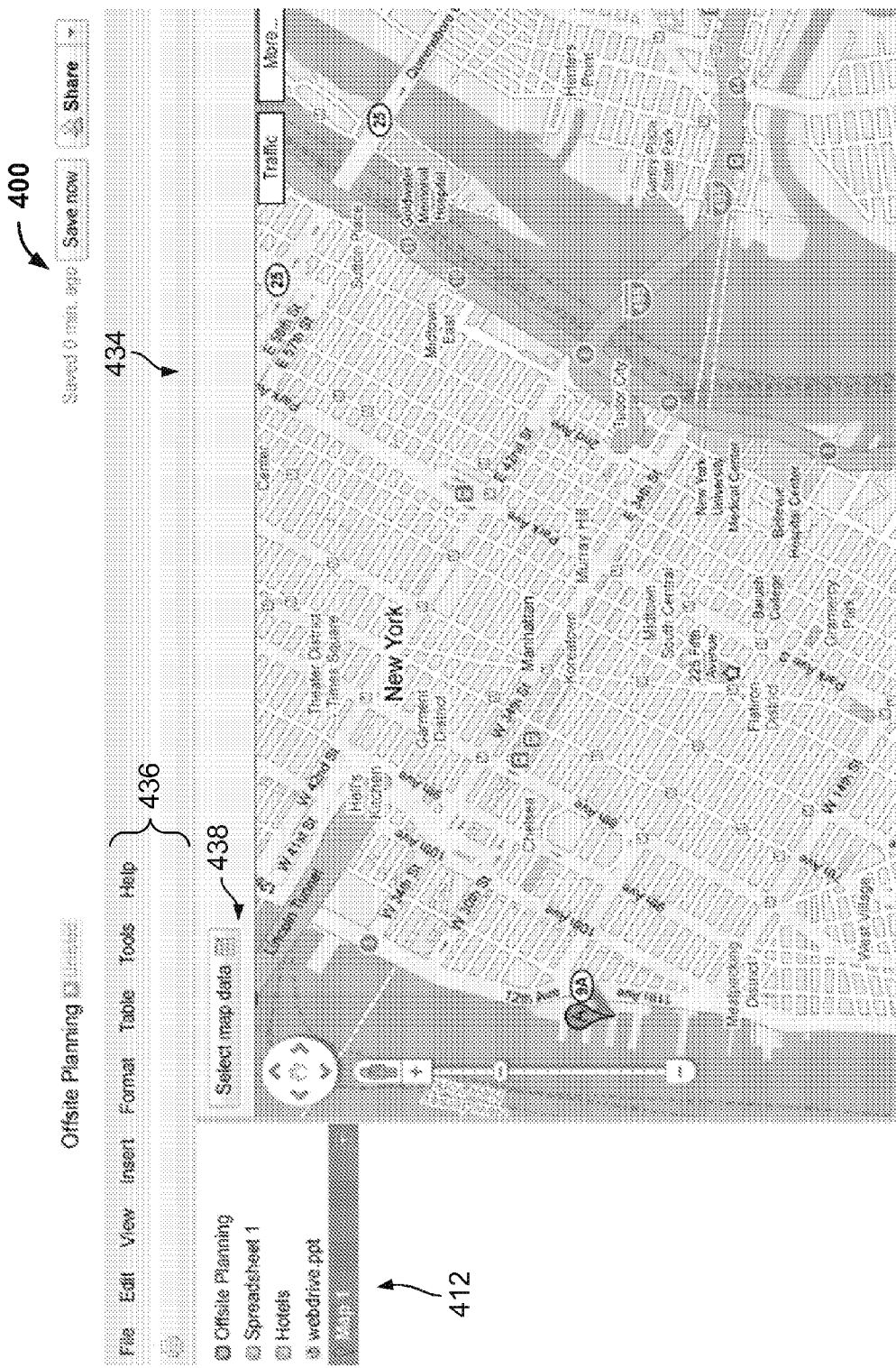
Figure 4M:
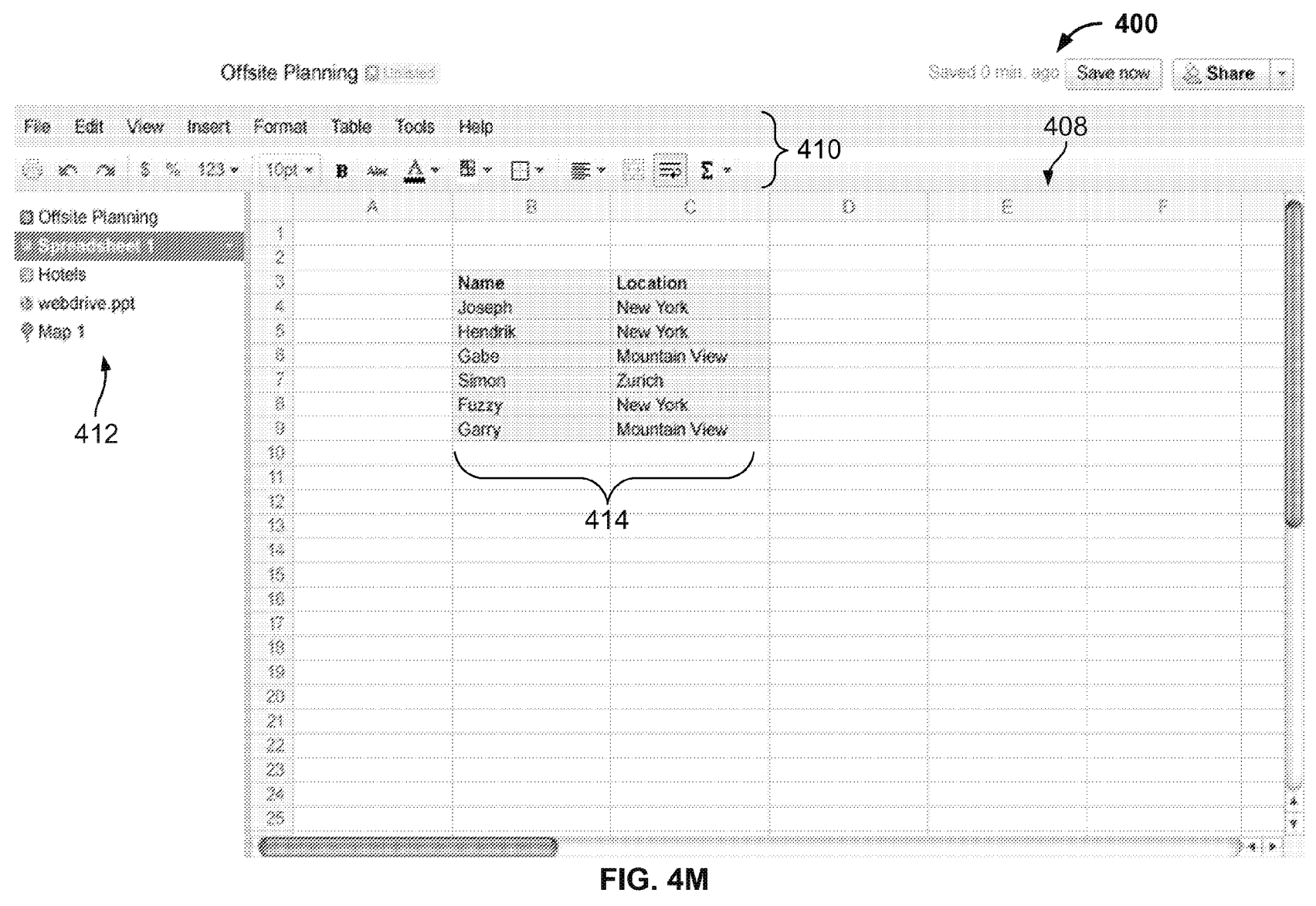
Figure 4N:
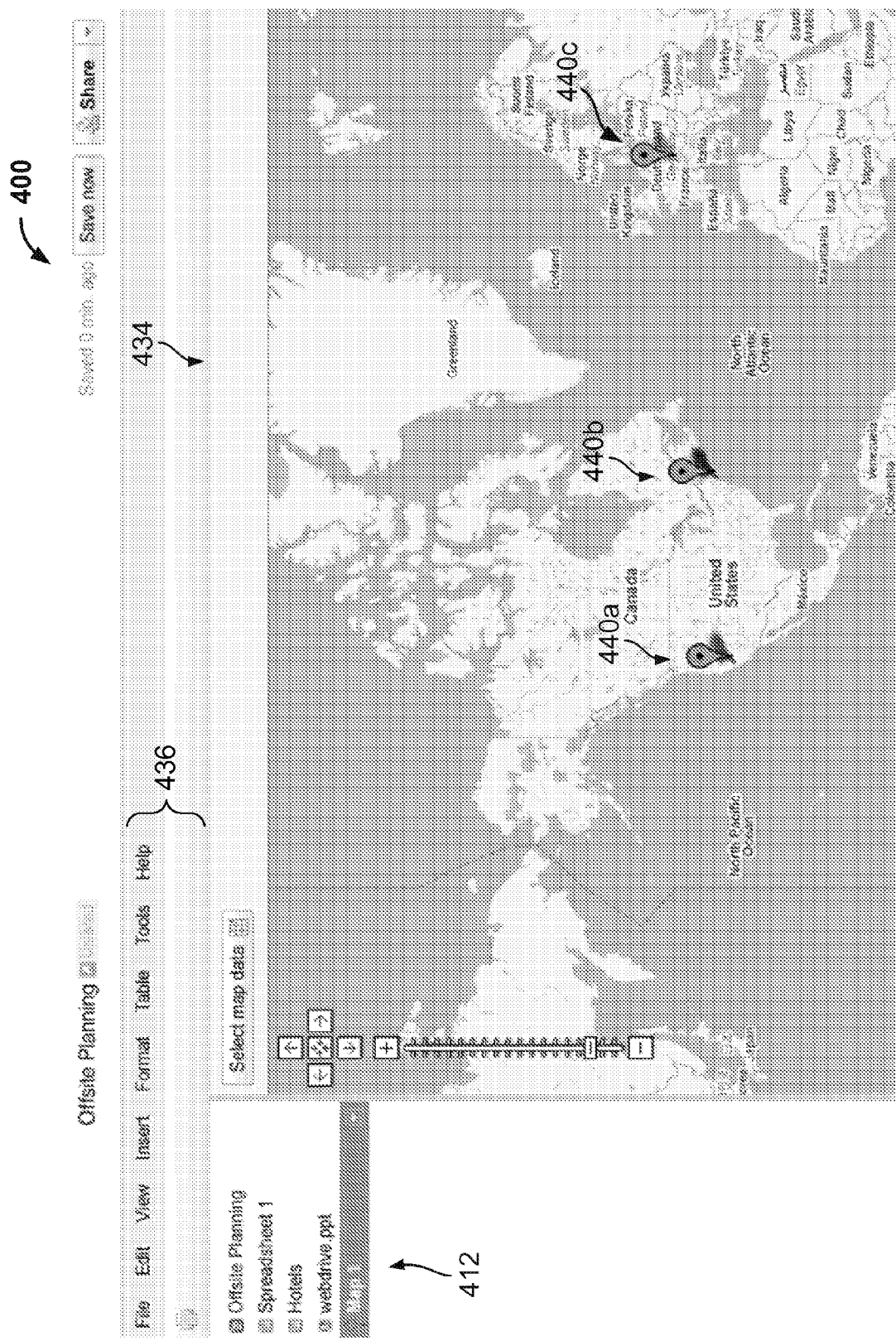
Figure 4O:
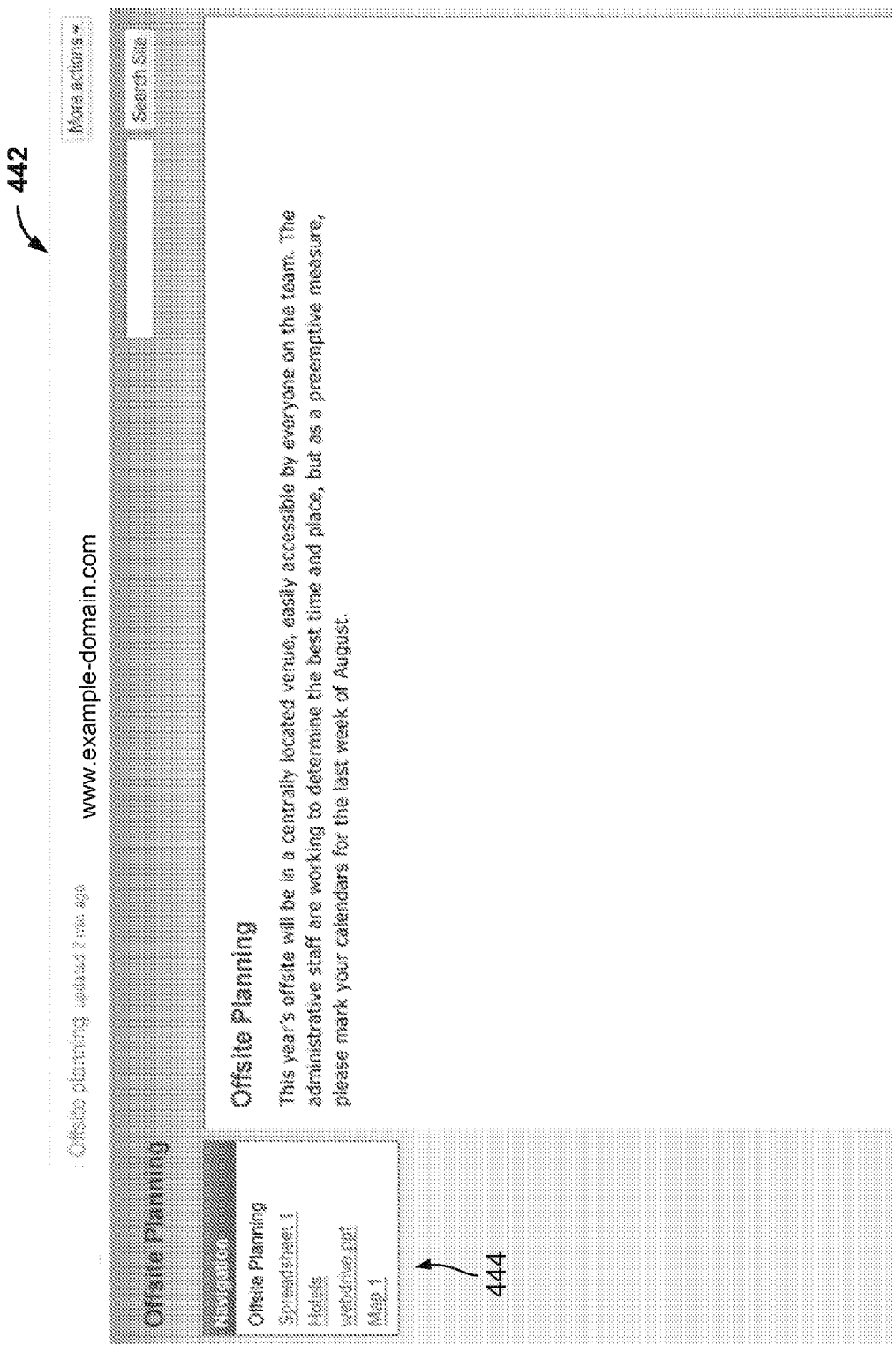

FIGS. 4A-O are screenshots of an example interface 400 for providing an electronic document collection. The example interface 400 for the document collection can be provided on a computing device (e.g., computer system 102, client-side computer system 154, clients 208a-n). The interface 400 can be provided by a variety of applications on the computing device, such as a web browser application, a thin client, an application with locally-implemented features, etc. The example interface 400 can be provided through interactions with a server system (e.g., provided "in the cloud"), such as server-side computer system 152 with its application integration server system 156 and application server systems 158a-n, and integration server system 202. The interface can also be provided locally on a computing device (e.g., a laptop computer, a desktop computer, a netbook, a smart phone, etc.).

FIG. 4A depicts an example interface 400 for a document collection entitled "Offsite Planning." The document collection includes a word processing sub-document 402 and selectable menus and features 404 for the word processing sub-document 402 and the document collection.

In FIG. 4B, the example interface 400 depicts expansion of the "File" menu and expansion of the "Add a page" menu entry. Options 406 for adding a sub-document to the "Offsite Planning" sub-document include word processing type sub-documents, spreadsheet type sub-documents, and presentation type sub-document. In this example, the spreadsheet option is indicated as being selected from the options 406. In client-server implementations, such as the systems 150 and 200 described above, selection of the spreadsheet option can cause a request for addition of a spreadsheet type sub-document to the document collection to be provided from the client device (e.g., clients 208*a-n*) to the server system (e.g., integration server system 202).

FIG. 4C depicts the example interface 400 after input requesting addition of a spreadsheet sub-document to the document collection. A new spreadsheet sub-document 408 is provided in the interface 400 and selectable menus and features 410 for the spreadsheet sub-document 408 and the document collection are provided. Additionally, a selectable menu 412 of sub-documents that are part of the "Offsite Planning" document collection is provided on the left side of the interface 400. The menu 412 can be used to toggle the interface 400 between displaying the word processing sub-document 402 and the spreadsheet sub-document 408. In client-server implementations, the client device (e.g., clients 208*a-n*) can be provided with information (e.g., code for instantiating the sub-document module 170*b*) by the server system (e.g., integration server system 202) for providing the new spreadsheet sub-document 410 in the interface 400.

Referring to FIG. 4D, the interface 400 provides the word processing sub-document 402 in response to selection of the associated entry for the word processing sub-document from the sub-document menu 412. As shown in FIG. 4D, the menu and features 404 are again displayed in conjunction with the word-processing sub-document 402. FIG. 4D provides an example of toggling between sub-documents in the interface 400 for the "Offsite Planning" document collection.

In FIG. 4E, the interface 400 displays the spreadsheet sub-document 408 in response to selection of the corresponding entry in the sub-document menu 412. As depicted, the selectable menu and feature 410 for the spreadsheet sub-document are provided in the interface 400. Further depicted in FIG. 4E, a user has entered content 414 into cells of the spreadsheet sub-document 408 regarding names and locations. In client-server implementations, the client device can be configured to provide the content 414 to the server system and, in response, the server system can be configured to update data corresponding to the spreadsheet sub-document to include the content 414.

FIG. 4F depicts expansion of the "File" menu and selection of the "More . . . " entry from the sub-document options 406 after entry of the content 414 in the spreadsheet sub-document 408. Referring to FIG. 4G, in response to selection of the "More . . . " entry, an "Add page" window 416 is presented in the interface 400. The window 416 includes a variety of document types 418 that can be included as sub-documents in the document collection, such as a map sub-document, a photo gallery sub-document, a web page sub-document, etc. The window 416 also includes a list of preexisting sub-documents 420 that can be selected for inclusion in the document collection, such as the "Hotels" spreadsheet sub-document and the "Webdrive" presentation sub-document. In client-server implementations, the window 416 can be populated with document types 418 and/or the preexisting sub-documents 420 based upon communication with the server system.

Referring to FIG. 4H, the interface 400 depicts the document collection after selection of the "Hotels" spreadsheet from the window 416. The "Hotels" spreadsheet 422 is provided in the interface 400 with the selectable menus and features 410 for spreadsheet type sub-documents and the sub-document menu 412 (now containing the "Hotels" sub-document). The "Hotels" spreadsheet sub-document 422 is depicted as including content 424 providing information regarding various hotel rates. Similar to the addition of the spreadsheet sub-document 408, in client-server implementations, information (e.g., sub-document modules 170*a-n*) for the "Hotels" spreadsheet sub-document 422 can be provided to a client computing device by a server system.

Similar to FIG. 4F, the FIG. 4I depicts expansion of the "File" menu and selection of the "More . . . " entry from the sub-document options 406 after addition of the "Hotels" spreadsheet sub-document 422 to the document collection. The FIG. 4J depicts the "Add page" window 416 in response to selection of the "More . . . " entry from the options 406 presented in FIG. 4F. Like FIG. 4G, the window 416 includes the document types 418 that can be selected for a new sub-document and preexisting sub-documents 420 that can be added to the document collection.

Referring to FIG. 4K, the interface 400 depicts the document collection after selection of the "webdrive" presentation from the window 416. The "webdrive" presentation sub-document 426 is provided in the interface 400 with a first slide 428 and selectable thumbnail slides 430. The interface 400 is also provided with menu 432 for presentation type sub-documents and the sub-document menu 412 (now including an entry for the webdrive sub-document 426). In client-server implementations, selection of one of the thumbnails 426 can cause a client device to request information for providing the selected slide in its full size (e.g., the first slide 428) from a server system. In response, the server system (e.g., integrated server system 202) can interpret the requested slide using an application configured to interpret presentation type documents (e.g., using the applications 242*a-n* on the application server systems 204*a-n*) and provide the requested information to the client.

FIG. 4L depicts the interface 400 after the addition of a map sub-document 434 to the document collection. A menu 436 for map type sub-documents is provided in the interface 400 and the map sub-document is listed in the sub-document menu 412. A selectable button 438 is also provided in the interface 400 for selecting data for the map sub-document 434 from other sub-documents in the document collection.

After selecting the button 438, the entry for the spreadsheet sub-document 408 is selected from the sub-document menu 412 and the content 414 of the spreadsheet sub-document 408 is highlighted, as depicted in FIG. 4M. Such a sequence of action can cause the creation of a dynamic link in the map sub-document 434 to the highlighted content 414 in the spreadsheet sub-document 408. The dynamic link can be created by referencing a non-address identifier for the spreadsheet sub-document 408 in the map sub-document 434. In client-server implementations, information regarding this sequence of actions can be provided by a client device (e.g., clients 208*a-n*) to a server system (e.g., integration server system 202). The server system interface with applications for interpreting the map and spreadsheet sub-documents (e.g., applications 242*a-n* of application server systems 204*a-n*) to determine that the sequence of actions establishes a dynamic link between the sub-documents, to generate a link to the highlighted data in the spreadsheet sub-document, and to modify the map sub-document 434 to include the link.

Referring to FIG. 4N, after highlighting the content 414 in the spreadsheet sub-document 408 and returning to the map sub-document 434 in the interface 400, the map sub-document 434 has been automatically updated to include icons 440*a-c* that correspond to the locations indicated in the highlighted content 414. For example, the icon 440*a* corresponds to "Mountain View" (indicated in the highlighted content 414 for Gabe and Garry), icon 440*b* corresponds to "New York" (indicated in the highlighted content 414 for Joseph, Hendrik, and Fuzzy), and icon 440*c* corresponds to "Zurich" (indicated in the highlighted content 414 for Simon).

In client-server implementations, returning to the map sub-document 434 in the interface 400 (e.g., selection of the map entry in the sub-document menu 412) can cause a client (e.g., clients 208*a-n*) to request information from a server system (e.g., server system 202) for displaying the map sub-document 434 in the interface 400. The server system can interpret the map sub-document 434 using an appropriate application (e.g., applications 242*a-n*) and, when the newly created dynamic link to the spreadsheet sub-document 408 is encountered, the application can request interpretation of the linked-to data by a spreadsheet application. The server system can provide the request for interpretation of the linked-to data to the spreadsheet application and, in response, receive the linked-to data (the content 414), which can then be provided to the application interpreting the map sub-document 434. Using the linked-to data, the application can generate information for providing the icons 440*a-c* as part of the map sub-document 434, which can be provided to the client by the server system.

FIG. 4O depicts an example document 442 that can be generated by publishing the document collection created in FIGS. 4A-N. For example, the example document 442 can be a web page (e.g., an HTML document) that can include selectable links 444 to pages for each of the sub-documents of the document collection. The example document 442 can be published to a site (e.g., a website), such as "www.example-domain.com." Although the document collection can be accessible using a URL, such a URL may not be "user friendly" (e.g., a long string of random characters). Publication can be made to a site associated with URL that is more user friendly, such as URL specified by an owner of the document collection (e.g., user that created the document collection), a shortened URL that uniquely identifies the document collection based upon the document collection's content, etc. As a document collection and its sub-documents are modified, the published site associated with the document collection can be dynamically updated to reflect the modifications (e.g., pages of the published site can be dynamically generated from a corresponding document collection in response to page requests). In client-server implementations, a client can instruct publishing of a document collection and conversion of the document collection to a published document, such as a web page, can be performed by the server system and various applications (e.g., by the integration server system 202 in conjunction with the application server systems 204*a-n*).

Figure 5:
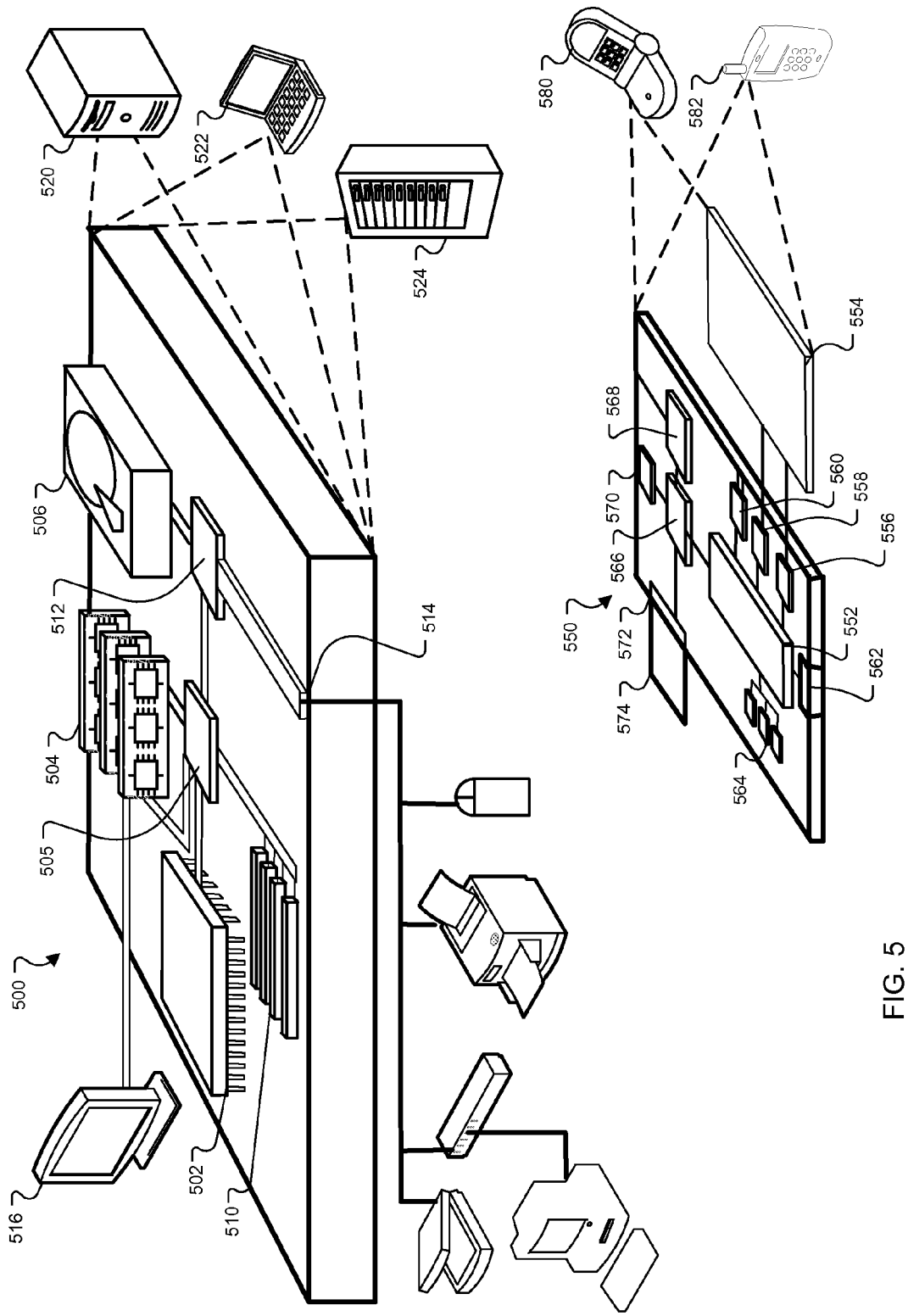
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing an electronic document collection may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
receiving, at a computer system, a user request to access an electronic document collection that integrates a plurality of electronic sub-documents that are each of one of a plurality of defined document types;
accessing information regarding the electronic document collection, the information identifying a first sub-document from the plurality of electronic sub-documents using a first non-address identifier that does not provide access to the first sub-document and that can be used to locate the first sub-document within a data repository;
identifying a first document type from the plurality of defined document types for the first sub-document based on the first non-address identifier;
accessing the first sub-document using the first non-address identifier via a first software application that is configured to provide access for the first document type;
identifying a dynamic link in the first sub-document to a second sub-document from the plurality of electronic sub-documents, the dynamic link using a second non-address identifier that does not provide access to the second sub-document and that can be used to locate the second sub-document within the data repository;
identifying a second document type from the plurality of defined document types for the second sub-document based on the second non-address identifier;
accessing the second sub-document using the second non-address identifier via a second software application that is configured to provide access for the second document type;
receiving a user selection that identifies at least part of the second sub-document as an indicated portion of the second sub-document; and
integrating only the indicated portion of the second sub-document into the first sub-document wherein the first sub-document is a map sub-document that includes a depiction of a geographic area and integrating only the indicated portion of the second sub-document includes causing geographic locations to be displayed in the first sub-document based on only the indicated portion of the second sub-document,
wherein causing geographic locations to be displayed in the first sub-document includes interpreting the second sub-document using the second software application to provide interpreted data to the first software application and wherein integrating only the indicated portion of the second sub-document into the first sub-document includes integrating the interpreted data into the first sub-document.

2. The method of claim 1, wherein integrating only the indicated portion of the second sub-document into the first sub-document is performed by the first software application.

3. The method of claim 1, wherein identifying a dynamic link in the first sub-document to a second sub-document from the plurality of sub-documents is performed using the first software application.

4. The method of claim 1, wherein identifying the first document type from the plurality of defined document types for the first sub-document based on the first non-address identifier includes accessing information regarding the first sub-document using the first non-address identifier.

5. The method of claim 1, further comprising:
tracking operations performed with respect to the first sub-document and the second sub-document at an undo stack;
receiving an undo request relating to a previous operation from the undo stack; and
performing the undo request using the first software application if the previous operation relates to the first sub-document and performing the undo request using the second software application if the previous operation relates to the second sub-document.

6. The method of claim 1, further comprising:
transmitting information to a client computing device from which the user request was received wherein the information, when interpreted at the client computing device, causes a graphical representation of the document collection to be output for display at the client computing device.

7. An apparatus, comprising:
a memory having program instructions stored therein; and
one or more processors configured to execute the program instructions, wherein the program instructions, when executed, cause the one or more processors to:
receive a user request to access an electronic document collection that integrates a plurality of electronic sub-documents that are each of one of a plurality of defined document types,
access information regarding the electronic document collection, the information identifying a first sub-document from the plurality of electronic sub-documents using a first non-address identifier that does not provide access to the first sub-document and that can be used to locate the first sub-document within a data repository, identify a first document type from the plurality of defined document types for the first sub-document based on the first non-address identifier, access the first sub-document using the first non-address identifier via a first software application that is configured to provide access for the first document type, identify a dynamic link in the first sub-document to a second sub-document from the plurality of electronic sub-documents, the dynamic link using a second non-address identifier that does not provide access to the second sub-document and that can be used to locate the second sub-document within a data repository, identify a second document type from the plurality of defined document types for the second sub-document based on the second non-address identifier, access the second sub-document using the second non-address identifier via a second software application that is configured to provide access for the second document type, receive a user selection that identifies at least part of the second sub-document as an indicated portion of the second sub-document; and integrate only the indicated portion of the second sub-document into the first sub-document wherein the first sub-document is a map sub-document that includes a depiction of a geographic area and integrating only the indicated portion of the second sub-document includes the one or more processors causing geographic locations to be displayed in the first sub-document based on only the indicated portion of the second sub-document, wherein the program instructions further cause the one or more processors to cause geographic locations to be displayed in the first sub-document by interpreting the second sub-document using the second software application to provide interpreted data to the first software application and wherein integrating only the indicated portion of the second sub-document into the first sub-document includes integrating the interpreted data into the first sub-document.

8. The apparatus of claim 7, wherein the program instructions cause the one or more processors to integrate only the indicated portion of the second sub-document into the first sub-document using the first software application.

9. The apparatus of claim 7, wherein the program instructions cause the one or more processors to identify the dynamic link in the first sub-document using the first software application.

10. The apparatus of claim 7, wherein the program instructions cause the one or more processors to identify the first document type from the plurality of defined document types for the first sub-document based on the first non-address identifier by accessing information regarding the first sub-document using the first non-address identifier.

11. The apparatus of claim 7, wherein the program instructions further cause the one or more processors to:

track operations performed with respect to the first sub-document and the second sub-document at an undo stack;

receive an undo request relating to a previous operation from the undo stack; and perform the undo request using the first software application if the previous operation relates to the first sub-document and performing the undo request using the second software application if the previous operation relates to the second sub-document.

12. The apparatus of claim 7, wherein the program instructions further cause the one or more processors to:

transmit information to a client computing device from which the user request was received wherein the information, when interpreted at the client computing device, causes a graphical representation of the document collection to be output for display at the client computing device.

13. A non-transitory computer readable medium including program instructions executable by one or more processors that, when executed, cause the one or more processors to perform operations comprising:

receiving, at a computer system, a user request to access an electronic document collection that integrates a plurality of electronic sub-documents that are each of one of a plurality of defined document types;

accessing information regarding the electronic document collection, the information identifying a first sub-document from the plurality of electronic sub-documents using a first non-address identifier that does not provide access to the first sub-document and that can be used to locate the first sub-document within a data repository;

identifying a first document type from the plurality of defined document types for the first sub-document based on the first non-address identifier;

accessing the first sub-document using the first non-address identifier via a first software application that is configured to provide access for the first document type;

identifying a dynamic link in the first sub-document to a second sub-document from the plurality of electronic sub-documents, the dynamic link using a second non-address identifier that does not provide access to the second sub-document and that can be used to locate the second sub-document within a data repository;

identifying a second document type from the plurality of defined document types for the second sub-document based on the second non-address identifier;

accessing the second sub-document using the second non-address identifier via a second software application that is configured to provide access for the second document type;

receiving a user selection that identifies at least part of the second sub-document as an indicated portion of the second sub-document; and integrating only the indicated portion of the second sub-document into the first sub-document wherein the first sub-document is a map sub-document that includes a depiction of a geographic area and integrating only the indicated portion of the second sub-document includes causing geographic locations to be displayed in the first sub-document based on only the indicated portion of the second sub-document, wherein causing geographic locations to be displayed in the first sub-document includes interpreting the second sub-document using the second software application to provide interpreted data to the first software application and wherein integrating only the indicated portion of the second sub-document into the first sub-document includes integrating the interpreted data into the first sub-document.

14. The non-transitory computer readable medium of claim 13, wherein integrating only the indicated portion of the second sub-document into the first sub-document is performed by the first software application.

15. The non-transitory computer readable medium of claim 13, wherein identifying a dynamic link in the first sub-document to a second sub-document from the plurality of sub-documents is performed using the first software application.

16. The non-transitory computer readable medium of claim 13, wherein identifying the first document type from the plurality of defined document types for the first sub-document based on the first non-address identifier includes accessing information regarding the first sub-document using the first non-address identifier.

17. The non-transitory computer readable medium of claim 13, further comprising:
- tracking operations performed with respect to the first sub-document and the second sub-document at an undo stack;
- receiving an undo request relating to a previous operation from the undo stack; and
- performing the undo request using the first software application if the previous operation relates to the first sub-document and performing the undo request using the second software application if the previous operation relates to the second sub-document.

* * * * *